(12) United States Patent
D'Aoust et al.

(10) Patent No.: US 12,207,602 B2
(45) Date of Patent: Jan. 28, 2025

(54) STRUCTURE FOR MODULES OF A PLANT GROWING FACILITY

(71) Applicant: Ferme d'Hiver Technologies Inc., Brossard (CA)

(72) Inventors: Yves D'Aoust, Saint-Lambert (CA); Marie-José Montpetit, Boston, MA (US); Stéphane Rainville, Montréal (CA)

(73) Assignee: Ferme d'Hiver Technologies Inc., Brossard (CA)

( * ) Notice: Subject to any disclaimer, the term of this patent is extended or adjusted under 35 U.S.C. 154(b) by 131 days.

(21) Appl. No.: 17/614,026

(22) PCT Filed: Jun. 10, 2020

(86) PCT No.: PCT/CA2020/050795
§ 371 (c)(1),
(2) Date: Nov. 24, 2021

(87) PCT Pub. No.: WO2020/248052
PCT Pub. Date: Dec. 17, 2020

(65) Prior Publication Data
US 2022/0322624 A1   Oct. 13, 2022

Related U.S. Application Data

(60) Provisional application No. 62/859,846, filed on Jun. 11, 2019.

(51) Int. Cl.
*A01G 31/06* (2006.01)
*A01G 9/14* (2006.01)
*A01G 9/24* (2006.01)

(52) U.S. Cl.
CPC .......... *A01G 31/06* (2013.01); *A01G 9/1423* (2013.01); *A01G 9/246* (2013.01); *A01G 9/249* (2019.05)

(58) Field of Classification Search
CPC ........ A01G 31/06; A01G 9/249; A01G 9/246; A01G 9/14; A01G 9/1423; A01G 31/04;
(Continued)

(56) References Cited

U.S. PATENT DOCUMENTS 4,837,990 A    6/1989  Peleg
5,598,662 A *  2/1997  Droste .................... B05B 17/08
                                               47/62 R
(Continued)

FOREIGN PATENT DOCUMENTS

CN    203735171    7/2014
FR    2431826      2/1980
(Continued)

OTHER PUBLICATIONS

International Search Report, 3 pages, Felix-Antoine Dandenault, Aug. 28, 2020.

*Primary Examiner* — Assres H Woldemaryam
*Assistant Examiner* — Brook Victoria Schmid
(74) *Attorney, Agent, or Firm* — Benoit & Cote Inc.; Charles-Andre Caron

(57) ABSTRACT

There is a module for vertical farming. Vertical posts form a grid having rows in both the longitudinal direction and transverse direction. Diagonal support members are installed between posts in a longitudinal direction, along two opposed inner sides of the module, one being along a corridor for passage. In the transverse direction, other diagonal support members are installed without blocking the corridor, and racks are formed in said direction comprising the other diagonal support members, the racks extending vertically for growing plants therein along a height thereof. Floor anchors
(Continued)

and corresponding ceiling anchors, located respectively at the bottom and at the top of each one of the posts, are provided to fasten modules on top of each other such that the structure formed by the posts is the load-bearing structure. Catwalks are installed for human passage in the corridor and between adjacent racks.

19 Claims, 37 Drawing Sheets

(58) Field of Classification Search
CPC .. A01G 31/042; A01G 31/045; A01G 31/047; A47G 7/04; A47G 7/041; E04H 5/08; E04H 1/1205; E04H 5/00; E04H 2005/005; E04H 14/00; E04G 1/00; E04G 1/04; E04G 1/20; E04G 1/02; E04G 1/14; E04G 1/17; B65G 1/00; A47B 47/00; A47B 57/00
USPC .......................................... 211/189, 190–193
See application file for complete search history.

(56) References Cited

U.S. PATENT DOCUMENTS

| | | | |
|---|---|---|---|
| 11,363,761 B2* | 6/2022 | Neuhoff, Jr. | A01G 7/045 |
| 2006/0156624 A1* | 7/2006 | Roy | A01G 31/02 |
| | | | 47/62 R |
| 2014/0020292 A1* | 1/2014 | McNamara | A01G 9/249 |
| | | | 47/66.7 |
| 2015/0351329 A1* | 12/2015 | Heidl | A01G 9/023 |
| | | | 211/49.1 |
| 2016/0014977 A1* | 1/2016 | Esaki | A01G 31/06 |
| | | | 47/66.6 |
| 2017/0354099 A1* | 12/2017 | Haughton | A01G 9/249 |
| 2019/0159415 A1* | 5/2019 | Bertram | A01G 9/18 |

FOREIGN PATENT DOCUMENTS

| | | | | |
|---|---|---|---|---|
| JP | 2011024533 | | 2/2011 | |
| RU | 2015654 | | 7/1994 | |
| WO | WO-2009133219 A1 | * | 11/2009 | ............ A01G 31/02 |
| WO | WO-2015027267 A1 | * | 3/2015 | ............ A01G 31/02 |
| WO | WO-2019157306 A1 | * | 8/2019 | ........... A01G 9/0293 |
| WO | WO-2020194161 A1 | * | 10/2020 | ............ A01G 31/02 |

* cited by examiner

SECTION A-A

STRUCTURE FOR MODULES OF A PLANT GROWING FACILITY

CROSS-REFERENCE TO RELATED APPLICATIONS

This application claims benefit or priority of U.S. provisional patent application 62/859,846, filed Jun. 11, 2019, which are hereby incorporated herein by reference in their entirety.

BACKGROUND

(a) Field

The subject matter disclosed generally relates to plant growing facilities, such as vertical agriculture. More specifically, it relates a structural system for stacking modular units for vertical agriculture and making each modular unit self-standing.

(b) Related Prior Art

Agriculture involves a great variety of challenges. Among the modern solutions developed to address some of these challenges, greenhouse culture was developed and followed, more recently, by vertical farming, which involves growing plants in a closed and controlled environment.

As always, productivity and efficiency of the process matters, and there is therefore an ongoing need for improving the yield and/or minimizing the resources needed to output a batch of high-quality produce from a given space.

SUMMARY

According to a first aspect, there is provided a module for vertical farming comprising: an inner side and an opposed inner side along a longitudinal direction of the module; a corridor extending in the longitudinal direction; racks for growing plants therein, wherein the racks extend lengthwise from the corridor in a direction which is transverse to the longitudinal direction; a plurality of posts having a bottom and a top and forming a grid having rows in both the longitudinal direction and transverse direction, the posts extending vertically; and diagonal reinforcing support members within pairs of adjacent posts which extend along the inner side and the opposed inner side, wherein all other rows of posts extending in the longitudinal direction are free of diagonal reinforcing support members within pairs of adjacent posts within said rows thereby allowing transverse passage.

According to an aspect, the diagonal reinforcing support members within pairs of adjacent posts which extend along the inner side and the opposed inner side are provided in a pair of crossing diagonal reinforcing support members forming an X shape.

According to an aspect, all posts extend within the racks except a row of posts extending in the longitudinal direction along the corridor by the inner side of the module.

According to an aspect, within the posts which extend within the racks, except the row of posts extending in the longitudinal direction along the corridor by the inner side of the module, there is, between pairs of adjacent posts within the transverse direction, a diagonal reinforcing support member within the racks to increase a support thereof.

According to an aspect, the module further comprises a plurality of floor anchors and a plurality of ceiling anchors corresponding to the floor anchors, located respectively at the bottom and at the top of each one of the posts, According to an aspect, the ceiling anchors receive a fastener for fastening any corresponding floor anchor of another distinct module located above said module.

According to an aspect, the module further comprises tiles which are non-structural and disposed under the plurality of floor anchors or over the plurality of ceiling anchors, the tiles covering a whole floor surface or a whole ceiling surface, respectively, to form a partition between an inside and an outside the module with respect to the floor surface or ceiling surface.

According to an aspect, the module further comprises a catwalk laid onto a plurality of floor anchors forming adjacent parallel rows.

According to an aspect, the catwalk is laid in every path in the module free of any diagonal support member.

According to an aspect, the plurality of floor anchors and the plurality of ceiling anchors are flat and arranged in a vertical plane.

According to an aspect, the racks comprise a plurality of modular units, each comprising an area for plant growth.

According to an aspect, the posts form a portion of the racks, the portion of the racks which extends vertically.

According to an aspect, the modular units are fastened to the posts forming the portion of the racks.

According to an aspect, the posts forming the portion of the racks comprise a unit support and the modular units are installed onto the unit support.

According to an embodiment, there is provided a module for vertical farming comprising: a corridor extending in a longitudinal direction; racks for growing plants therein, wherein the racks extend lengthwise from the corridor in a direction which is transverse to the longitudinal direction, the racks having a corridor end and a row end; a plurality of posts having a bottom and a top and forming a grid having rows in both the longitudinal direction and transverse direction, the posts extending vertically, wherein a portion of the posts in the transverse direction extend between the corridor end and the row end of a same one of the racks, namely posts in the rack portion; and diagonal reinforcing support members installed between pairs of adjacent posts in the rack portion.

According to an aspect, the module further comprises a plurality of floor anchors and a plurality of ceiling anchors corresponding to the floor anchors, located respectively at the bottom and at the top of each one of the posts, According to an aspect, the ceiling anchors receive a fastener for fastening any corresponding floor anchor of another distinct module located above said module.

According to an aspect, the module further comprises tiles which are non-structural and disposed under the plurality of floor anchors or over the plurality of ceiling anchors, the tiles covering a whole floor surface or a whole ceiling surface, respectively, to form a partition between an inside and an outside the module with respect to the floor surface or ceiling surface.

According to an aspect, the module further comprises a catwalk laid onto a plurality of floor anchors forming adjacent parallel rows.

According to an aspect, the catwalk is laid in every path in the module free of any diagonal support member.

According to an aspect, the plurality of floor anchors and the plurality of ceiling anchors are flat and arranged in a vertical plane.

According to an aspect, the racks comprise a plurality of modular units, each comprising an area for plant growth.

According to an embodiment, there is provided a facility comprising at least two modules according to any one of claims 5 to 10 or 16 to 21, piled up one above another with the floor anchors of an upper one matching the location of corresponding ceiling anchors in a lower one.

According to an embodiment, there is provided a method for vertical farming comprising the steps of: providing a module enclosed by walls; installing a plurality of posts having a bottom and a top and forming a grid having rows in both the longitudinal direction and transverse direction, the posts extending vertically, in a longitudinal direction, along an inner side of the module, installing diagonal support members between adjacent posts, forming a corridor alongside the diagonal support members and parallel thereto; in the longitudinal direction, along an opposed inner side of the module, installing diagonal support members between adjacent posts for strengthening a structure of the module; in a transverse direction perpendicular to the longitudinal direction, installing diagonal support members between transversely adjacent posts, without blocking the corridor; and in the transverse direction, along the posts, providing racks, which extend vertically for growing plants therein along a height thereof, and further extend in length in the transverse direction from the opposed inner side of the module and reaching the corridor without blocking the corridor.

According to an aspect, the diagonal reinforcing support members within the longitudinal direction are provided in a pair of crossing diagonal reinforcing support members forming an X shape.

According to an aspect, the method further comprises providing a plurality of floor anchors and a plurality of ceiling anchors corresponding to the floor anchors, located respectively at the bottom and at the top of each one of the posts.

According to an aspect, the method further comprises providing tiles which are non-structural and disposed under the plurality of floor anchors or over the plurality of ceiling anchors, the tiles covering a whole floor surface or a whole ceiling surface, respectively, to form a partition between an inside and an outside the module with respect to the floor surface or ceiling surface.

According to an aspect, the method further comprises laying a catwalk laid onto a plurality of floor anchors forming adjacent parallel rows.

According to an aspect, laying the catwalk comprises laying the catwalk along each rack and in the corridor for human passage.

According to an aspect, the method further comprises fastening the ceiling anchors to any corresponding floor anchor of another distinct module located above said module.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

There is described a vertical farming facility in which elements are arranged in order to output a large quantity of high-quality produce from a given space, and how the facility is structured to be able to output the large quantity efficiently. More specifically, for various reasons which are detailed below, the facility is made of individual modules, or modular units, in which crops are grown. To make optimal use of the volume of the facility, it would be advantageous if these modular units can be stacked to occupy a greater overall height. A structure which advantageously permits this stacking of modular units for growing crops is described below.

First, a modular unit is described to better understand its elements and how and why these elements are arranged as such.

Figure 1:
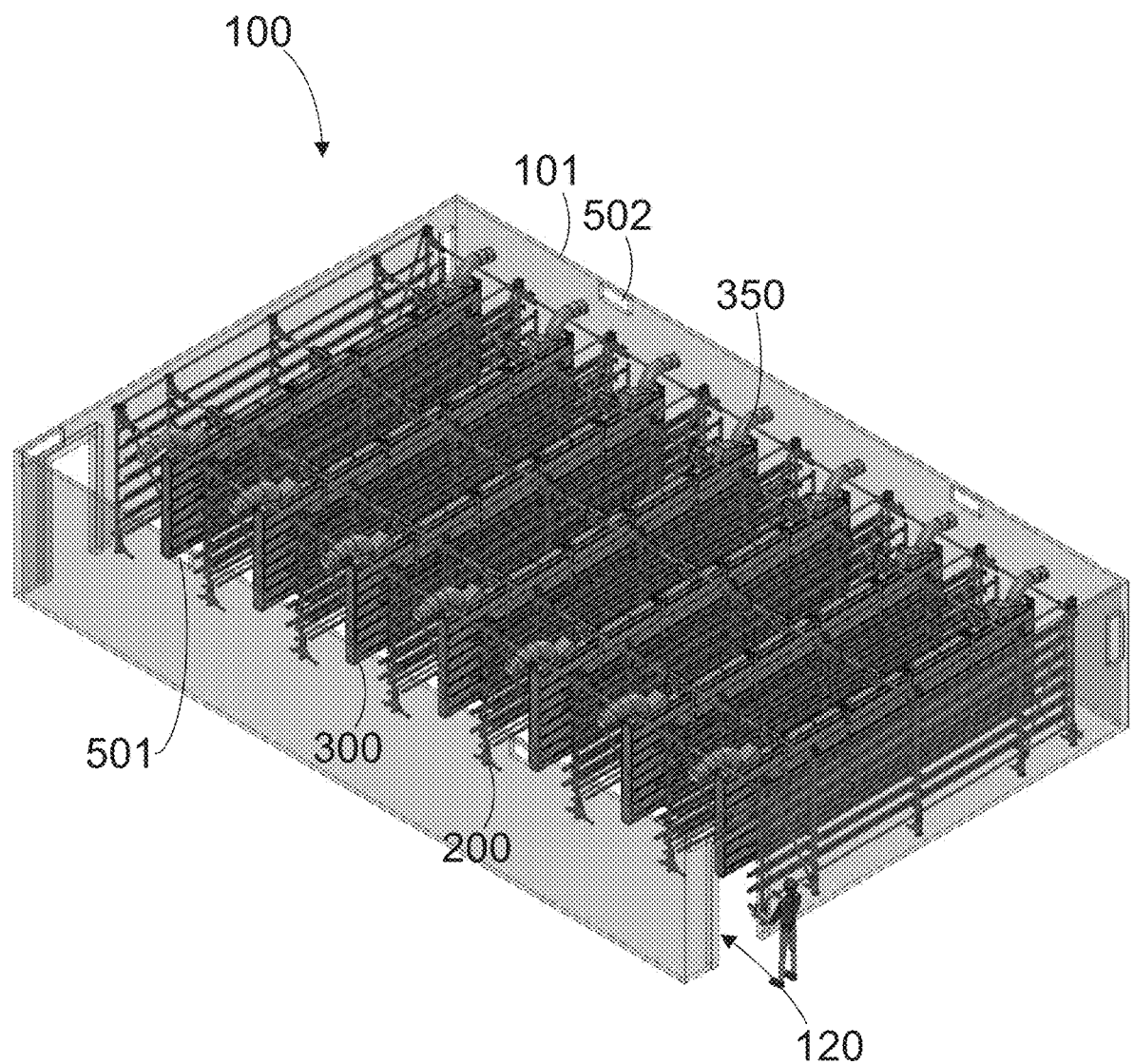
FIG. 1 is a perspective view illustrating a module of a plant growing facility comprising racks and lighting walls forming rows, comprising ventilation within the lighting walls, according to an embodiment.
Figure 2:
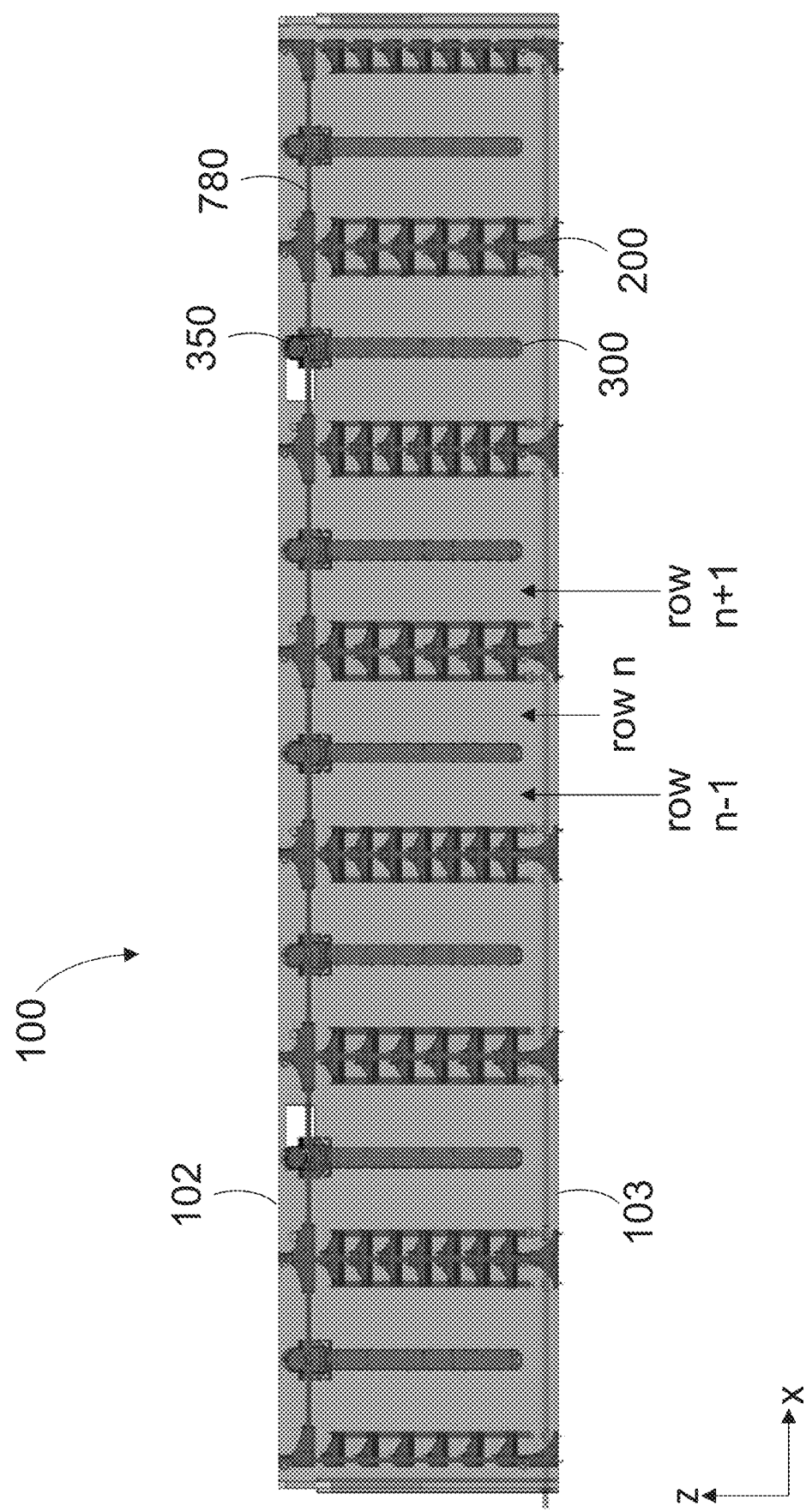
FIG. 2 is a side view illustrating racks and lighting walls forming rows, according to an embodiment.

According to an embodiment and referring to FIGS. 1 and 2, the vertical farming facility comprises modular units, or modules 100, each comprising physical walls 101, a ceiling 102 and a floor 103 which put constraints on a volume which is therefore definite, defined as being inside the enclosed space formed by said walls 101, ceiling 102 and floor 103. Rows can be formed in a specific manner which eases ventilation (performed sideways) and leaves space for active heat removal in the back of the lighting elements, in order to manage heat in an efficient way to ensure that the crops growing therein are kept at a proper temperature and to manage the usually high heat produced by the lighting close to the crops, which needs to be evacuated efficiently.

Figure 5:
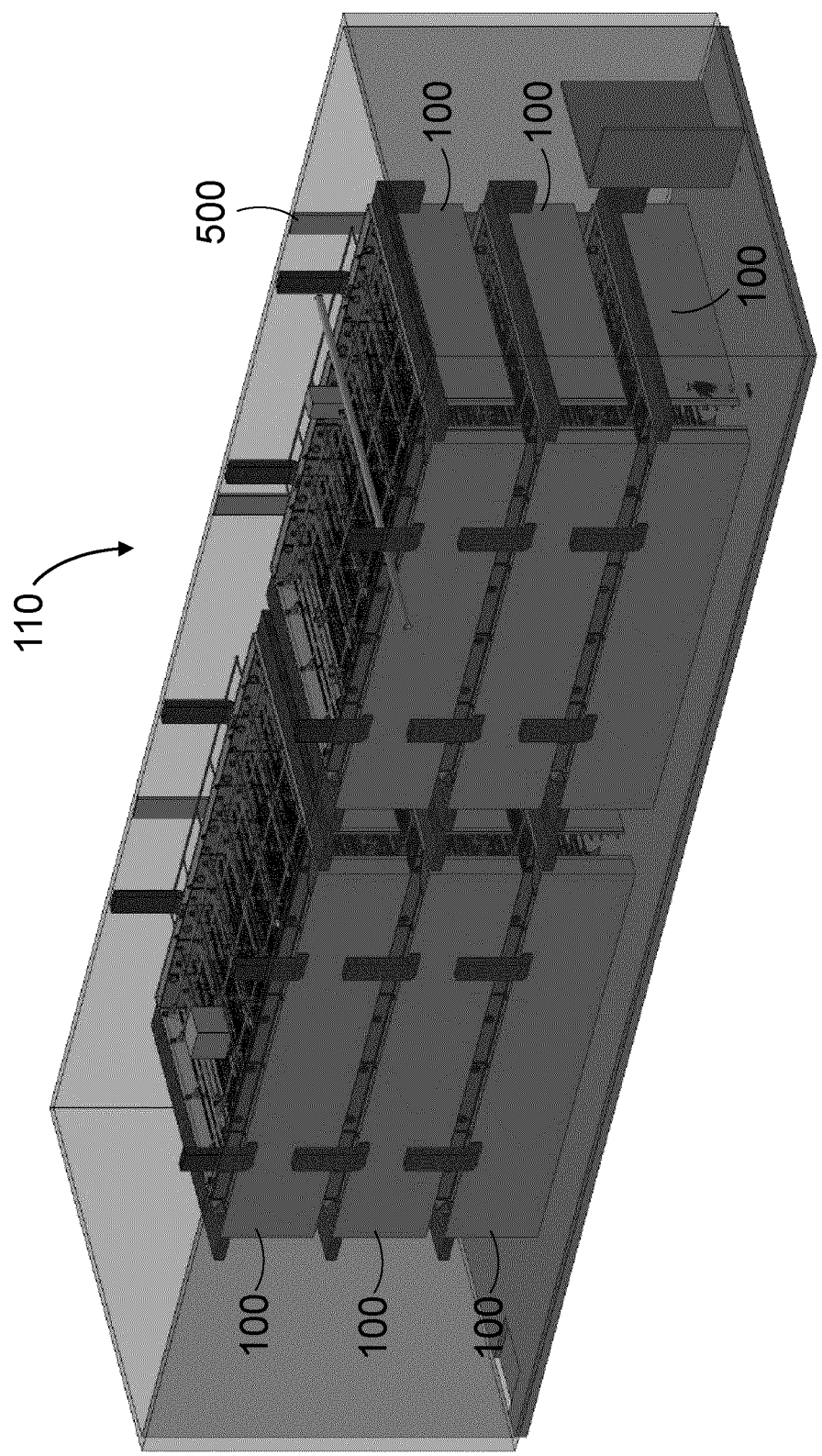
FIG. 5 is a perspective view illustrating a plant growing facility comprising a plurality of modules and a HVAC system for the modules, according to an embodiment.

According to an embodiment, each of the modules 100 forms an enclosed space and the modules work independently from each other. However, systems may be shared between the independent modules 100 provided within the same facility 110 for greater efficiency, as shown in FIG. 5. Systems that can be shared may include HVAC systems and electrical systems, for example.

Figure 3:
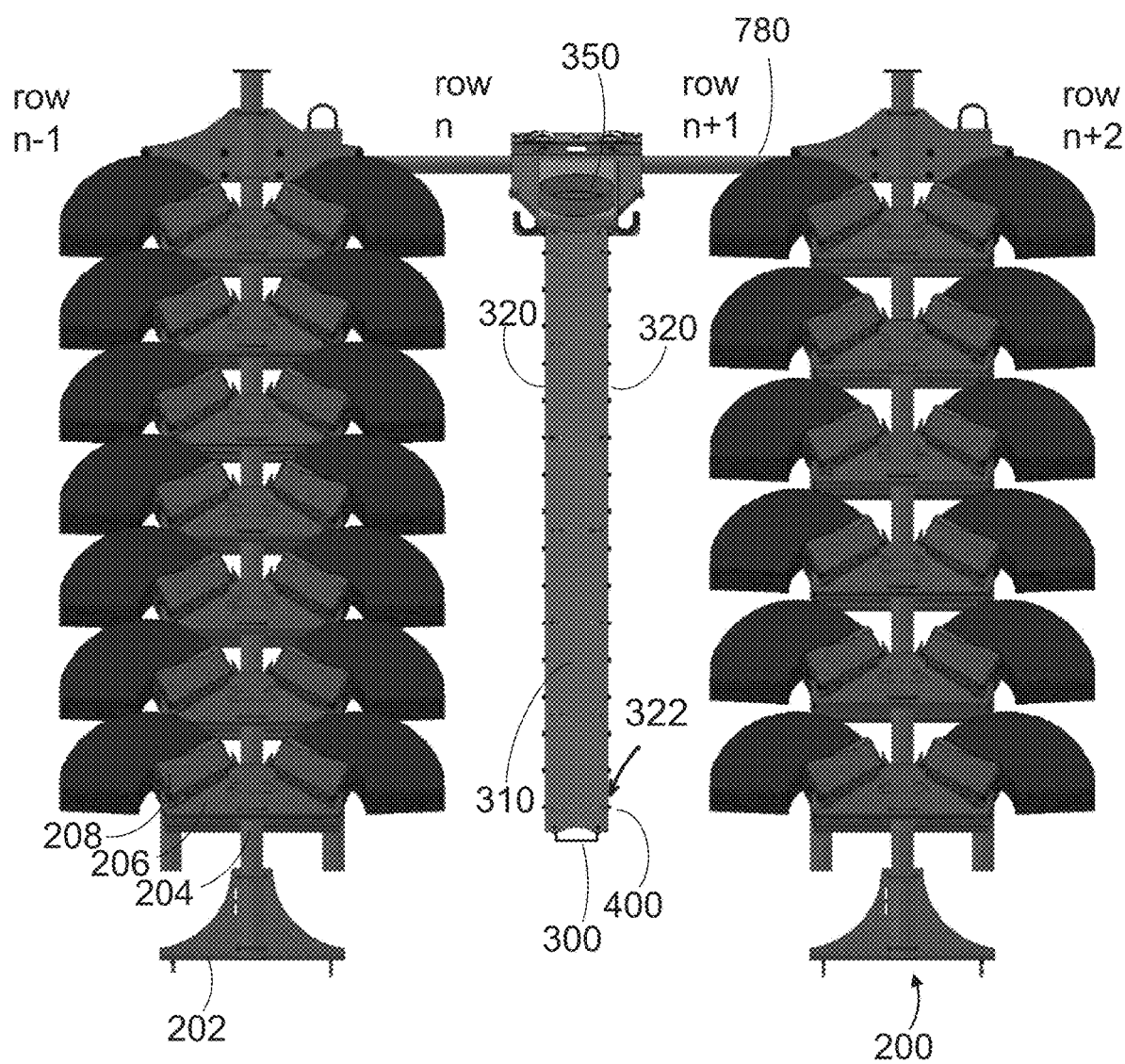
FIG. 3 is a side view illustrating two racks for growing crops and a lighting wall in between, comprising ventilation within the lighting walls, according to an embodiment.

Each module 100 comprises walls 101 enclosing the space along with a ceiling 102 and a floor 103, and the module 100 comprises racks 200 which are used for growing crops therein. Together, these walls 101, ceiling 102 and floor 103 create a partition between inside and outside which separates these different environments to be able to control the inside environment, especially in relation with air properties (temperature, humidity, etc.) and air quality (dust, insects, microorganisms, etc.). According to an embodiment, there is provided a plurality of racks and they are arranged in rows, as shown in FIGS. 1-3, where there are rows of racks (or more simply, the "racks" as they will be will be referred to below) and rows for passage in between, the rows for passage being defined as the space for passage between adjacent racks (or between adjacent rack pairs, since they will be described below as possibly put in a pair). Preferably, the rows are parallel, which implies that the racks 200 are parallel. According to an embodiment, the racks 200 are arranged back to back, or the rack 200 is large enough to accommodate plants which are oriented toward two different adjacent rows (see in FIG. 3 where each rack 200 has two sides for growing crops).

The floor 103 or the ceiling 102 (both are parallel and horizontal) of the module may define a conventional x,y plane, where the x-axis (or longitudinal axis) is now defined as being the axis along which rows are ordered (i.e., the corridor 120 of FIG. 1), and the y-axis (or transverse axis) is the axis in which the rows extend.

According to an embodiment, the racks 200 are vertical racks, where vertical farming is performed. As shown in FIG. 2, the rack 200 may extend from the floor 103 to the ceiling 102 in the conventional z-axis such that the plants occupy the entire height of the module 100. This can be advantageous in order to prevent the ventilated flow of air (discussed in more detail further below) to bypass the racks 200 from above or from below. Instead, the plants in the rack 200 occupy the whole height of the module 100 and the ventilated flow of air, described below as being horizontal, is forced to flow through the rows.

According to an embodiment, and as shown in FIGS. 2-3, each rack 200 or each pair of racks is interspaced with a lighting wall 300 which is parallel to the racks. Therefore, each row comprises, on one side, plants growing within the rack 200, and on the other side, a lighting wall 300 comprising lighting elements 400.

Accordingly, each lighting wall 300 should offer main supporting surfaces 320 on both sides thereof, each one in its respective row, for supporting the lighting elements 400 in direction of the crops in the facing rack 200. Each adjacent row is therefore a mirror of its adjacent row(s), e.g., in a given row (n), the rack with plants therein may be on the left side, while the lighting wall 300 will be present on the right side, and in the neighboring row (either n+1 or n−1), the rack 200 with plants therein would be on the right side, while the lighting wall 300 will be present on the left side.

According to an embodiment, each lighting wall 300 comprises a body 310 which has the two supporting surfaces 320 which are opposed on the body, each being oriented toward a row. Each supporting surface 320 comprises a portion for holding or installing lighting elements 400 therein or thereon. According to an embodiment, and as shown in FIGS. 2-3, the lighting wall 300 does not reach the floor 103, or at least, its weight is not supported by the floor 103. Instead, the lighting wall 300 is secured from the top, therefore from the structure at the ceiling or the same structure which holds the racks 200 together. This is useful to avoid having the lighting wall 300 wight onto the floor 103, which can therefore be dimensioned without having to bear the significant weight of the lighting wall 300. The structure is described further below, and it will be shown that the structural elements which forms said structure of frame bears the weight, and the floors 103 do not, facilitating the step of piling the modules.

Figure 6:
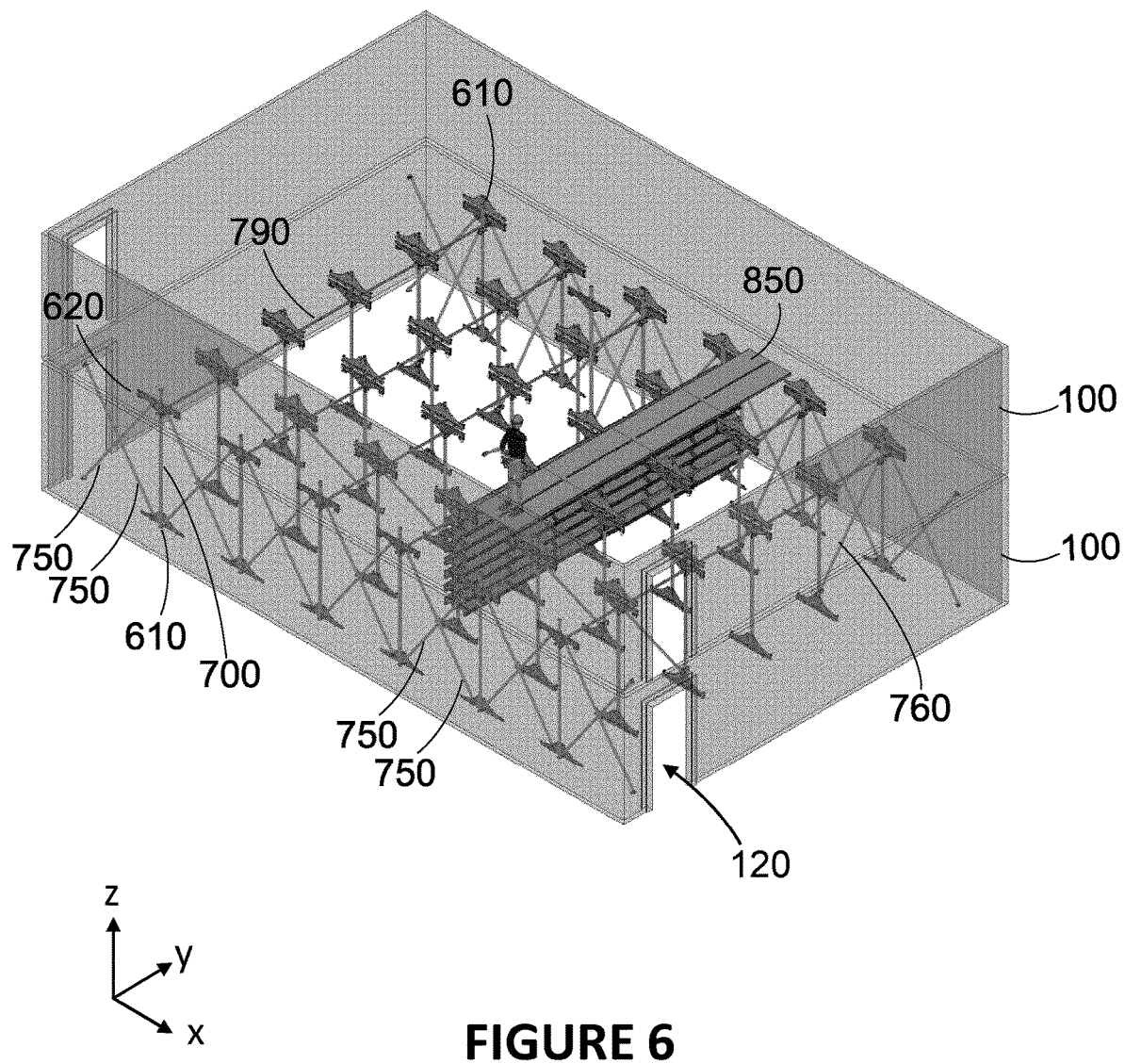
FIGS. 6-8 are perspective views illustrating a structure of a plant growing module in a stacking arrangement, according to an embodiment.

According to an embodiment, and as shown in FIG. 6, an extrusion 322 is made on the main surface to insert lighting elements 400 thereinto. For example, the lighting element 400 can be a LED strip comprising a plurality of LEDs, the strip being insertable into the extrusion 322. FIG. 6 shows the LED strips (the lighting elements 400) installed within extrusions 322 provided on the supporting surface 320 for holding the LED strips and capturing, from behind, the heat generated by the LEDs. Other examples may include holes for hooking LED strips or individual LEDs.

According to an embodiment, the body 310 of the lighting wall 300, including the supporting surfaces 320 which is in contact with the back of the lighting elements 400, is made of a material having a high thermal conductivity, typically a metal, such as aluminum. The lighting element 400 needs to be firmly in contact with the thermally-conductive material forming the main surface of the body of the lighting wall to ensure efficient heat conduction from the lighting element 400 to the lighting wall 300. In particular, the back portion of the LED or the back portion of the LED strip should be in firm contact with the supporting surface 320. Using an extrusion 322 to fit a LED strip therein is advantageous in that it holds, in a passive manner, the back of the strip in firm contact with the supporting surface 320 of the lighting wall 300. Using LEDs is also advantageous in that the heat generated by a LED for a given light intensity is relatively low and the heat is generated behind the LED, i.e., the heat is produced at a location opposed to the part that emits light. This is useful because heat can be captured from behind while having the LED emit full light intensity in the other direction (frontward).

According to an embodiment shown in FIG. 3, the body 310 of the lighting wall 300 is hollow or comprises some cavity or space therein to accommodate or form ducts for a heat-transporting fluid. The hollow portion or cavity defined within the body of the lighting wall 300 may be in contact with a ducting comprising ventilated air or comprising a flow of a high heat-capacity fluid; or the hollow portion or cavity is elongated and connected at both ends and forms an inner duct comprising ventilated air or comprising a flow of a high heat-capacity fluid.

One may therefore refer generally to such equipment as ducting 350 for heat-absorbing fluid. The fluid may be a gas (e.g., air), a liquid (e.g., glycol) or a combination thereof, or any other material or mixture which can flow inside the ducting 350.

If the hollow portion receives a ducting 350, the hollow portion within the body 310 should be shaped to enclose the ducting 350 with a large surface area of contact between them, wherein the surface area of contact comprises materials of high thermal conductivity in both cases to ensure a proper heat exchange between them, i.e., the inner shape of the cavity should be complementary to the outer shape of the ducting 350. If the hollow portion forms a ducting, it should be watertight or airtight to ensure that the fluid being transported therein is well confined to avoid leaks. In that case, there should be an input connector and an output connector which connect with the appropriate outside ducting for inputting and outputting the fluid. Such connectors should be airtight or watertight (i.e., fluid-tight), and the inputted fluid should be ventilated or pumped to generate a flowing movement.

FIGS. 1 and 3, for example, show the connectors for the ducting 350 within the light walls 300. It can also be seen in FIG. 4 that the ducting 350 connects at both ends to an input 351 and an output 352, shown as being apertures within the walls 101 of the module for connection to a source of fluid and a destination for the used fluid.

According to an embodiment, the fluid is air and the air is conditioned in the HVAC system for the facility.

In another embodiment, the fluid is of any suitable nature and it is conditioned separately from the HVAC system for the facility. This can be the case if the fluid is a liquid, such as glycol.

According to an embodiment, the fluid is precooled prior to being delivered to the ducting 350 in the lighting wall 300. For example, the fluid can be conditioned by having the fluid travel through ducts which are located outside (useful in cold weather). According to an embodiment, after having traveled through the ducting 350 of the lighting wall 300, the fluid can be delivered to piping (e.g., ensuring circulation of fluid/glycol therein) which travels in another neighboring room or building where it can contribute to the warming of that place.

In all cases, the fluid should absorb the heat generated by the lighting elements 400 when traveling through the lighting wall 300. It necessarily needs to be cooler than the inside of the lighting wall 300 for heat absorption to take place. Moreover, if the fluid is recirculated, it needs to be cooled again prior to being reinputted into the ducting 350.

The manner in which the ducting 350 is made within the light wall 300 should therefore ensures proper surface contact for heat exchange to take place.

Now referring to the racks 200, as shown in FIG. 3, the racks 200 include a support 202, a body 204 extending vertically and holding a plurality of plant supports 206 at defined heights. A pot 208 (also known as a tub) may be used for holding the plant and ease the handling and transport thereof.

Tubing can be provided, such as watering tubing 220, typically entering the module 100 through the ceiling 102 or an upper portion of the walls 101 to irrigate the racks 200 containing the plants and dispense other substances, such as nutrients. Tubing 220 should connect with the racks 200 and then typically exits the room through the floor or a lower portion of the walls to evacuate unabsorbed water and any other liquids dripping from the plants. The same applies to cabling and other ducts that take various substances in or out of the module 100.

Figure 4:
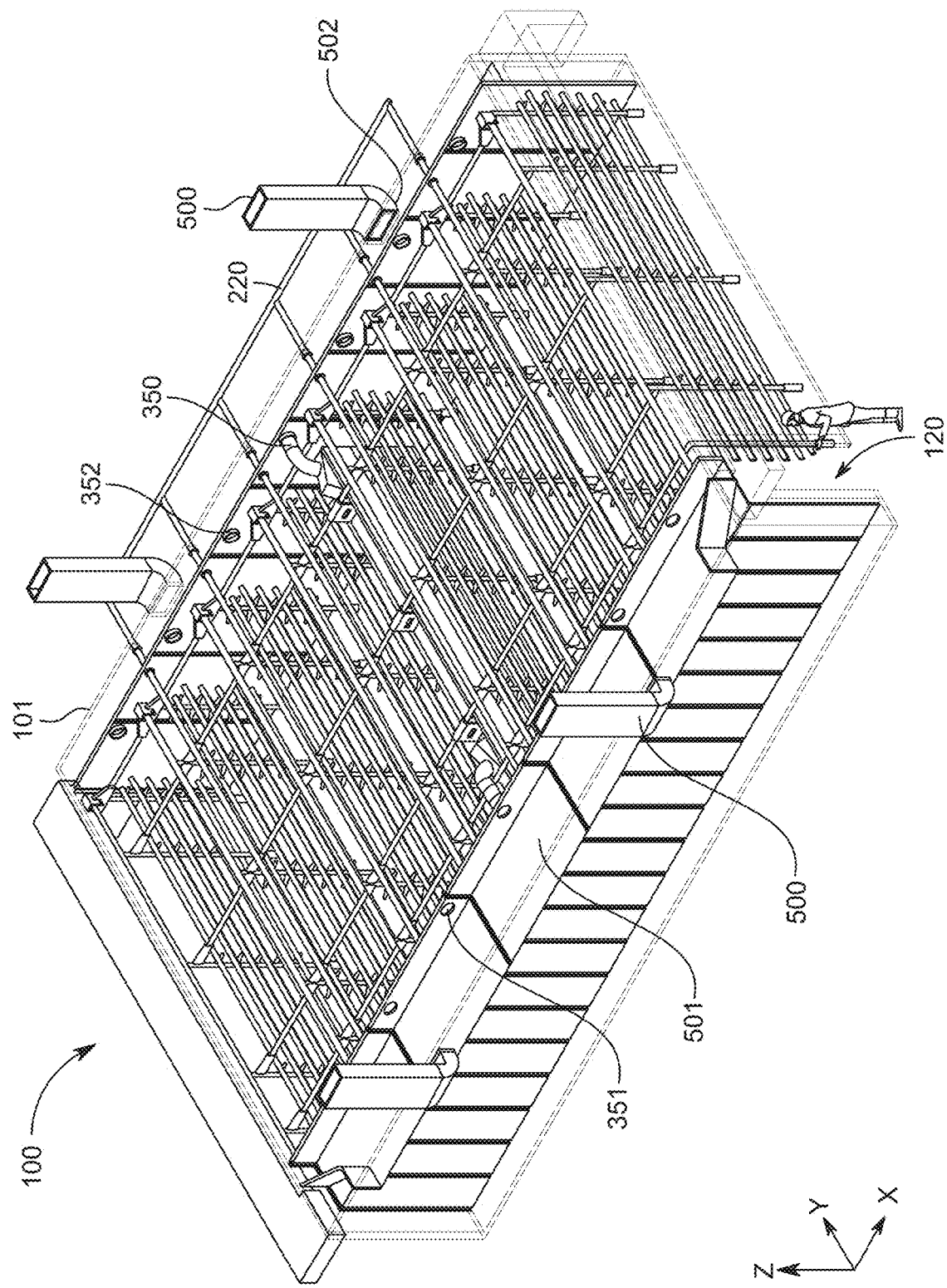
FIG. 4 is a perspective view illustrating a module of a plant growing facility comprising racks and lighting walls forming rows, comprising ventilation within the lighting walls and a HVAC system for the module, according to an embodiment.

Now referring to FIG. 4, there are shown ventilation ducts 500 which ventilate the module 100. The ventilation ducts 500 connect to the input 501 for the input of air inside the module 100. A plenum is formed within the ducting of the input 501 at the top of the module and along the side thereof, extending in the same axis (x-axis) as the axis in which rows are ordered in the module. Preferably, a corridor 120 providing access for personnel to the rows in the side of the plenum of the input 501, such that when air is ventilated into the plenum, the air the diffuses, through diffusers in the wall 101, into the corridor. The corridor 120 is therefore parallel to the plenum of the input 501 and perpendicular to the rows (the rows are ordered sequentially along said corridor 120). In other words, the incoming ventilated air faces the longitudinal axis of the rows, and the inputted air faces the rows in a manner similar to the side view of FIG. 2. The air is therefore forced through the rows, and travel in the direction in which the rows extend.

At the other (opposed) side of the module 100, by the end of the rows (the end opposed to the corridor 120 where the rows start), there is provided an output 502 which receives the air having travelled through the rows of the module 100, and outputs the air into the ventilation ducts 500 for conditioning in the HVAC system.

The air temperature within the rows is therefore mostly uniform along the row, and the ventilated air is conditioned to maintain the desired temperature, using a thermometer or a plurality of thermometers for control. Moreover, the air travels through the row along the supporting surface 320, therefore capturing some of the heat generated by the lighting elements 400 not captured by the ducting 350 within the lighting walls 300, therefore further contributing in removing the heat generated by these elements. Furthermore, wind speed along the rows is measured using an anemometer. The wind speed measurements are fed back to a controller (not shown) and the HVAC system is controlled to adjust the wind speed within desired parameters.

FIG. 5 shows that a module 100, and preferably a plurality of modules 100, can be installed in a room to form a vertical farming facility 110. The vertical farming facility is typically in a closed environment, i.e., not outside, and preferably with controlled interaction with the outside, normally from limited to none (for example, and without limitation, within an industrial building). The absence of significant interactions with the outside ensures that the closed environment in which the plants are grown is free from insects, parasites and sources of diseases which would then require the application of insecticides, pesticides and chemical treatments. In a closed environment, these irritants are very limited and the use of such possibly undesirable compounds can therefore be avoided. This results in pesticide-free produce, without having to endure the natural defaults which can be found in typical pesticide-free produce. In other words, pesticide-free organic fruit and vegetable can be produced with few esthetic defaults, a result which is typical of pesticide-intensive industrial farming. The protective enclosure of the facility can be provided by having each module 100 being well enclosed. The walls 100, ceiling 102, floor 103 should therefore be solid walls forming a partition between the inside and the outside, leaving only the doors as possible free airways, which can be closed and controlled, while the HVAC system is also controlled). Communicating passages (with doors) and stairs are provided between modules 100, but the whole room or facility will be well enclosed to avoid contamination from the outside or from other facilities.

FIG. 5 shows that the enclosure containing the plurality of modules 100 is a closed room. In order to prevent insects and pests of all sorts to enter the enclosure, it should be sufficiently airtight, and panels made of PVC appear as an appropriate option for the makeup of the walls of the enclosure. The room should have its own door to allow human passage and be closed by default to close the room. The same can be applicable for each module 100.

Walls of the module 100 are held by being attached or secured in any suitable manner to the structure described further below.

A slight relative overpressure (i.e., a positive pressure), through adequate pumping or venting, can be provided in the module 100 or the room of the facility comprising the module(s) 100 in order to ensure that air flows outwardly and not inwardly when the room door is open, avoiding ingress of contaminants.

The ventilation ducts 500 of all modules 100 in the facility 110 may be connected to the same, single HVAC system for the whole facility, resulting in efficiency gains by sharing the same systems (including other systems such as electrical systems) for all modules 100 which are enclosed and otherwise independent one from another.

Now referring to FIGS. 6-19, there is described a structure for the inside of the module 100 that allows the module to be self-standing and that allows modules 100 to be stacked one above the other safely.

Each module 100 comprises a plurality of floor anchors 610 and ceiling anchors 620.

Each ceiling anchor 620 is located at a specific location at the ceiling of the module 100 and has a corresponding floor anchor 610 located below it, on the floor of the module 100. The floor anchor 610 that corresponds to a given one of the ceiling anchors 620 is located at the same horizontal location, such that corresponding anchors 610, 620 are aligned when viewed from the top or from the bottom. In other words, the floor or the ceiling of the module may define a x,y plane and the floor anchor 610 that corresponds to a given one of the ceiling anchors 620 both have the same x,y coordinates, being distant by a vertical distance along the z direction only which corresponds to the height of the module.

This vertical distance between corresponding or opposed anchors between the top and the bottom of a single modular unit comprises a post 700 which can be a rod or any similar rigid member acting as a column between the anchors 610, 620 at the top and at the bottom. The post 700 has the length which corresponds to the vertical distance between two opposed corresponding anchors 610, 620 and is therefore installed in a vertical direction.

The post 700 can withstand a significant mechanical load in compression, and should therefore be made of a material which resists well to such pressure, while being sufficiently sized and shaped for this purpose. By ensuring that each of the floor anchors 610 and ceiling anchors 620 are located at specific, predetermined locations on the floor or ceiling of each module 100, when a module is piled up over another one, the anchors of different modules are thereby aligned and the weight of the upper module is supported by the posts 700 of the lower module.

Figure 7:
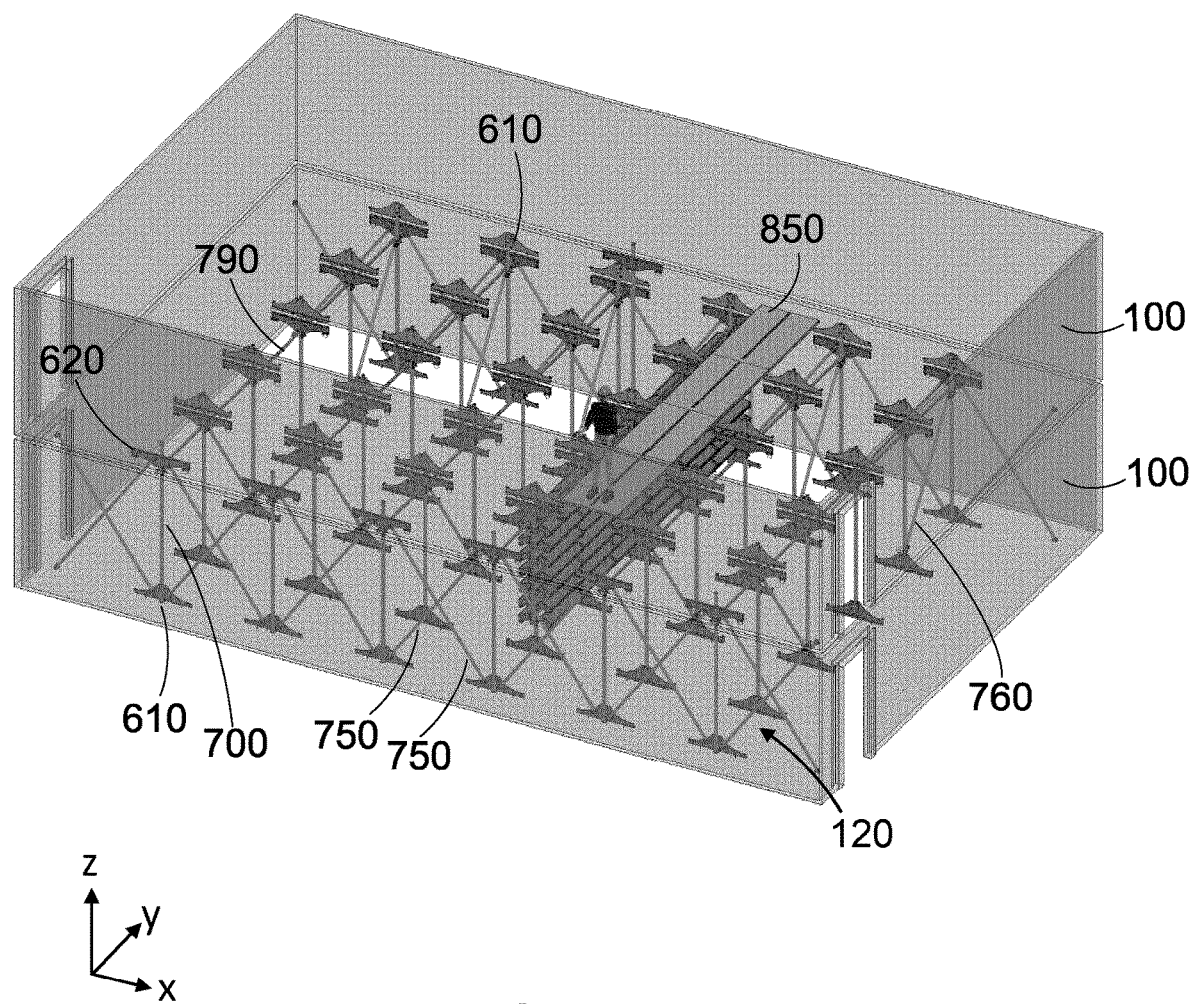
Figure 8:
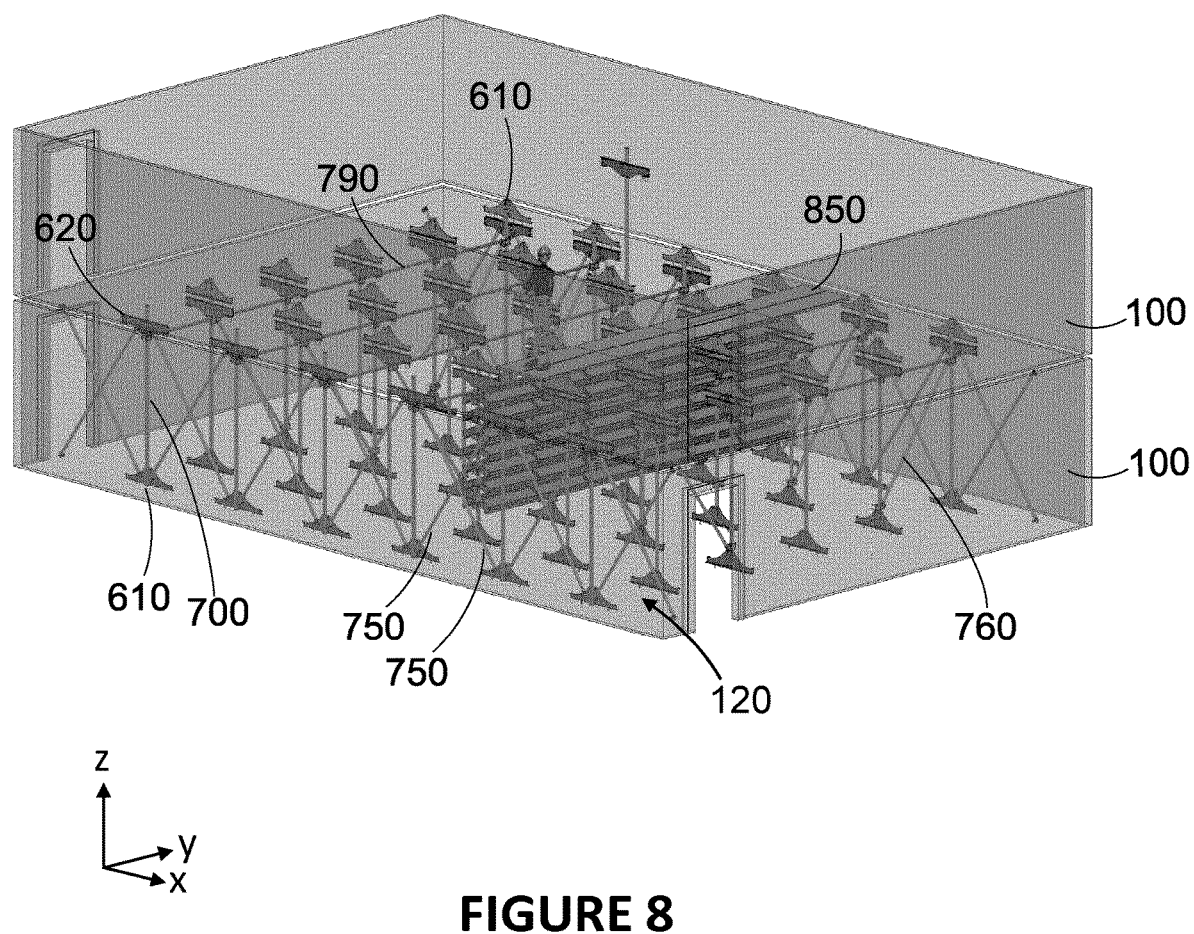

As shown in FIGS. 6-8, the plurality of floor anchors 610 and ceiling anchors 620 form a grid having rows in the x direction and rows in the y direction. In other words, the floor or the ceiling (both are parallel and horizontal) of the module may define an x,y plane, and when a plurality of floor anchors 610 are considered (or, equivalently, a plurality of ceiling anchors 620), there is a plurality of floor anchors 610, belonging to a given row in the x direction, which are spaced apart by a distance $\Delta x$ while having the same y coordinate, thereby forming the row of floor anchors in the x direction. Similarly, there is a plurality of floor anchors 610, belonging to a given row in the y direction, which are spaced apart by a distance $\Delta y$ while having the same x coordinate, thereby forming the row of floor anchors in the x direction. Each floor anchor 610 thereby belongs to one row in the x direction and one row in the y direction. The same applies to the ceiling anchors 620 which are located in the same grid pattern as the floor anchors 610 below.

According to an embodiment, the spacing in the x direction and in the y direction is regular, i.e., $\Delta x$ and $\Delta y$ are always the same. According to another embodiment, the spacing is variable between each row in at least one of the axes, i.e., $\Delta x$ and $\Delta y$ are variable. In either case, the spacing should be the same for two modules 100 such that when they are piled up, the floor anchors 610 of the upper one match the location of the ceiling anchors 620 of the lower module 100.

According to an embodiment, the posts 700 are within the racks 200. In other words, the posts 700 form the vertical portion of the rack 200, i.e., the elements that extend vertically from bottom to top and onto which other parts are fastened for holding the plants. According to a more specific embodiment, the posts 700 are within the racks 200 which are not on the sides of the module 100 (those may not need the structural support of the posts 700).

According to an embodiment, the posts 700 are the posts forming the body 204 of the rack 200, mentioned above as extending vertically and holding a plurality of plant supports 206 at defined heights (with the exception of posts 700 on the opposed side of the corridor 120; i.e., along an inner side of the module 100). Alternatively, only some of the posts 700, or none of them, may be the posts forming the body 204 of the rack 200, in which case the body 204 of the rack 200 is formed by other, independent posts unrelated to the structure.

According to an embodiment, there are provided diagonal reinforcing support members 750 and 760, each one of them having an upper end and a lower end for fastening to a location of the structure.

The diagonal reinforcing support members 750 are provided between a floor anchor 610 which has a direct neighbor (defined as an adjacent floor anchor 610) and the ceiling anchor 620 which corresponds to the adjacent floor anchor 610. This is well shown in FIGS. 6-8, and in particular, in FIGS. 9 and 15-16. The diagonal reinforcing support members 750 are provided in a pair of symmetrically opposed members forming a cross (X-shape) which reinforces the support of the ceiling anchors 620 by the floor anchors and further prevent shearing forces in the structure.

Figure 9:
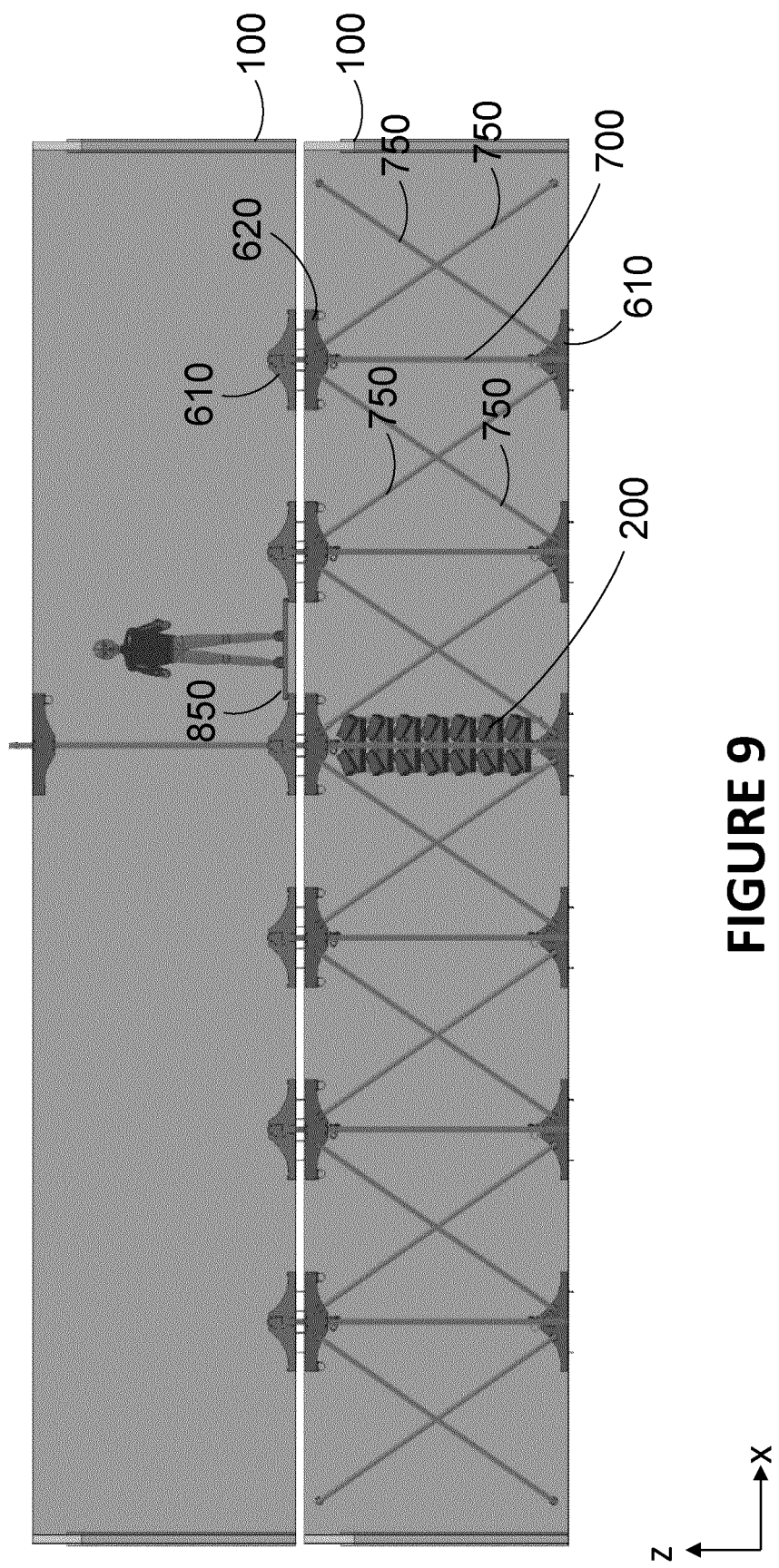
FIGS. 9-11 are a front view, a side view and a top view illustrating the structure of a plant growing module in a stacking arrangement, as in FIG. 6.
Figure 10:
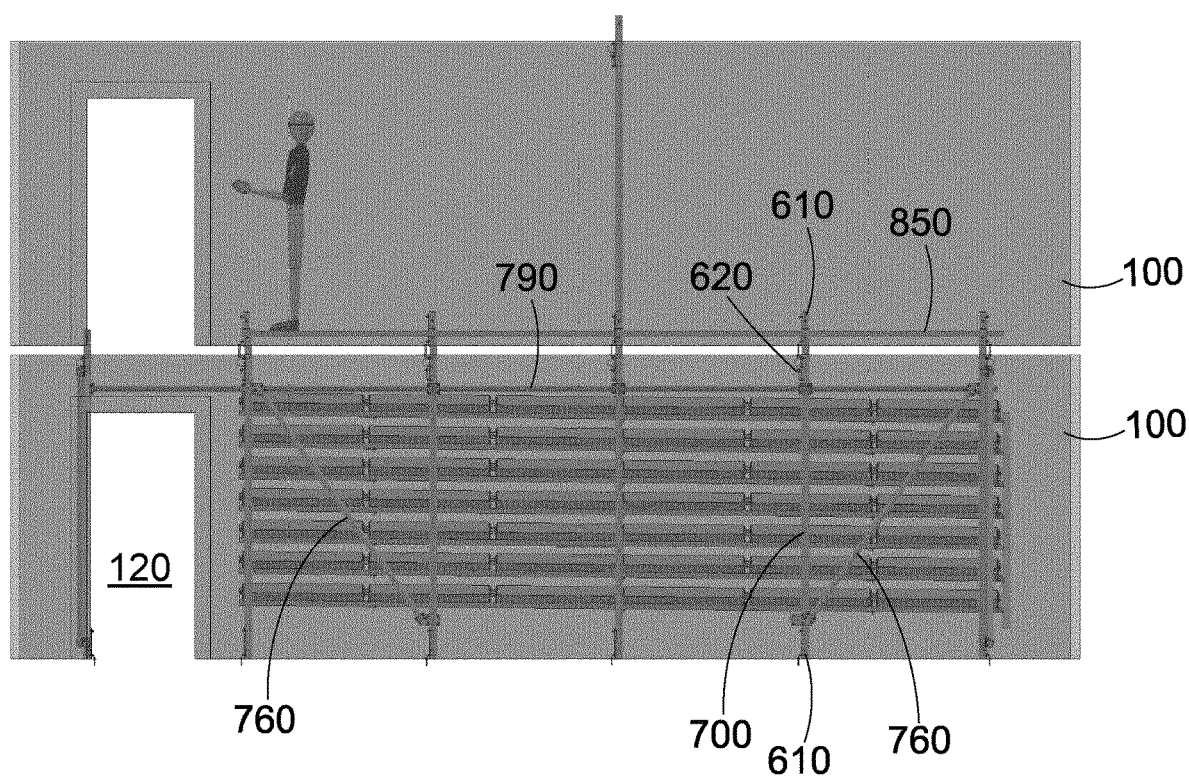
Figure 11:
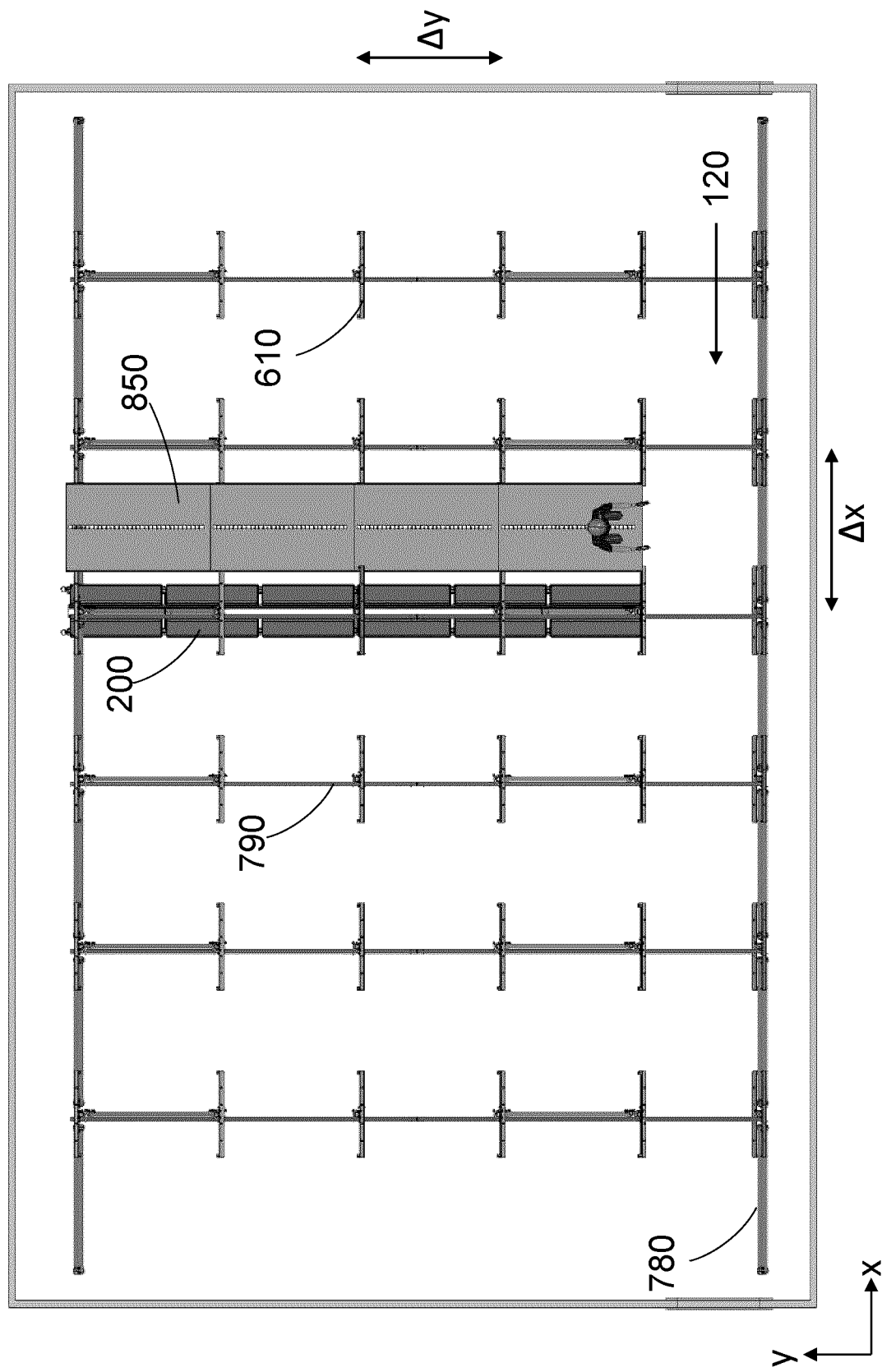
Figure 12:
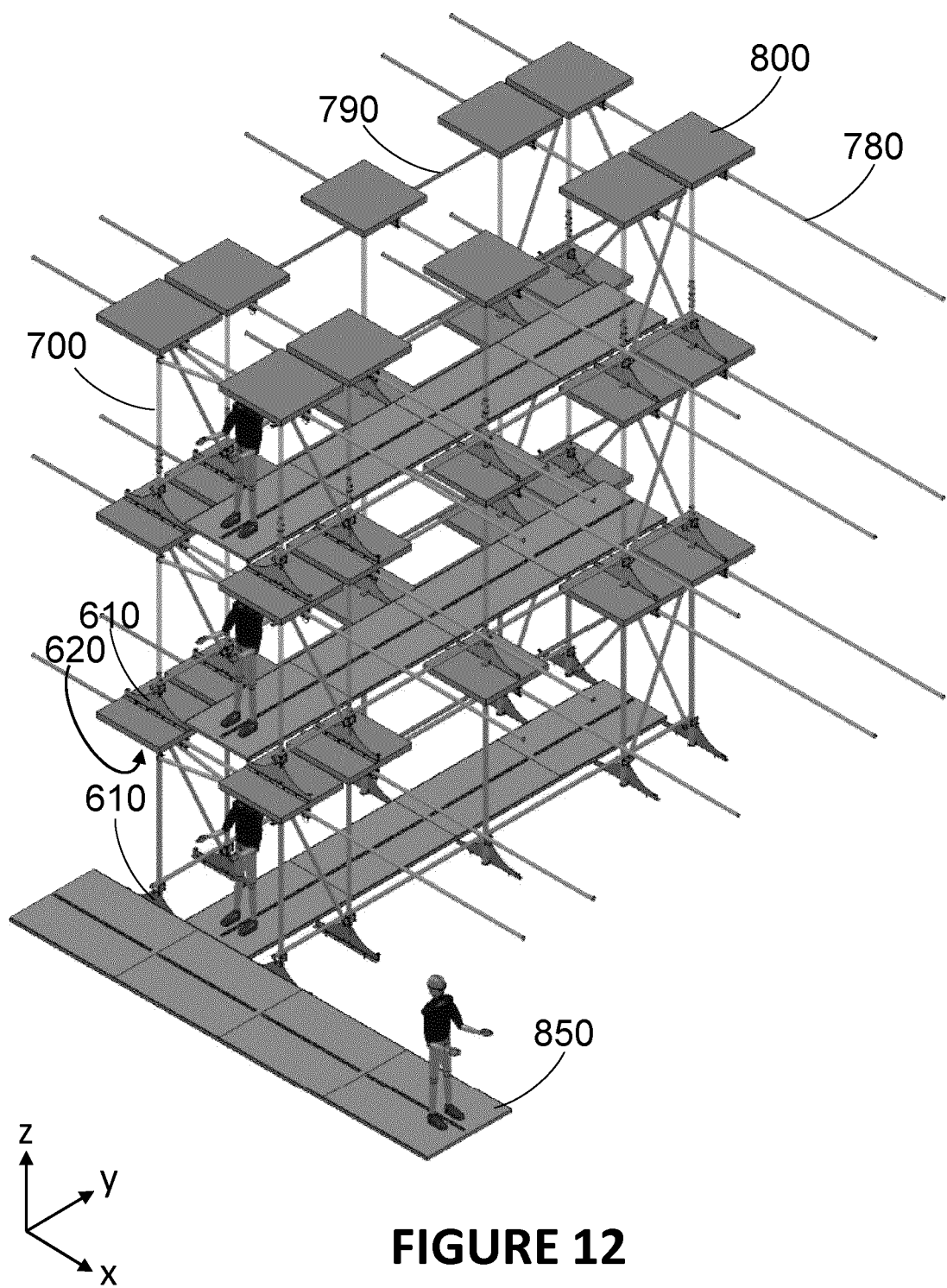
FIGS. 12-14 are perspective views illustrating a structure of a plant growing module in a stacking arrangement, according to an embodiment.
Figure 13:
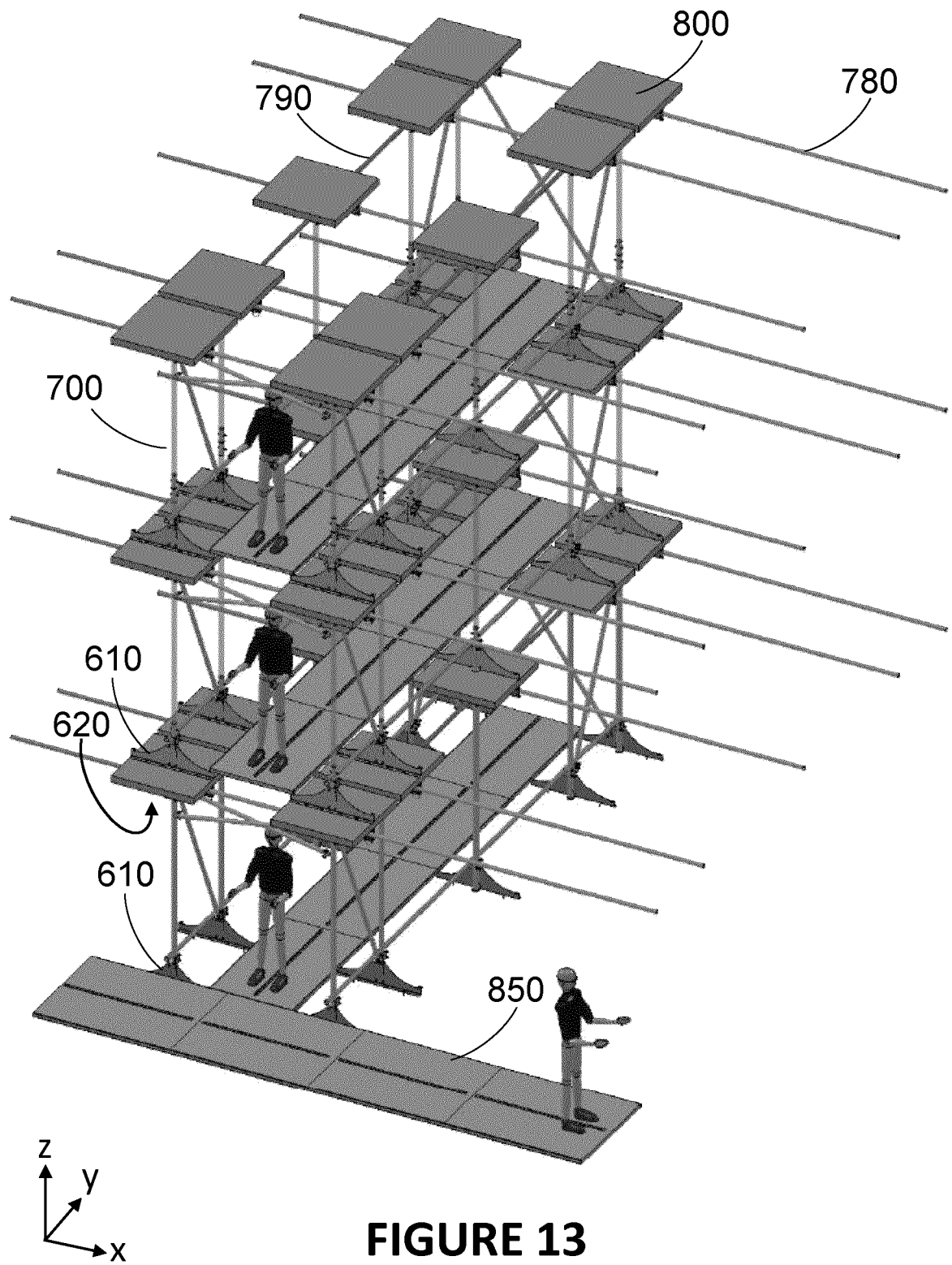
Figure 14:
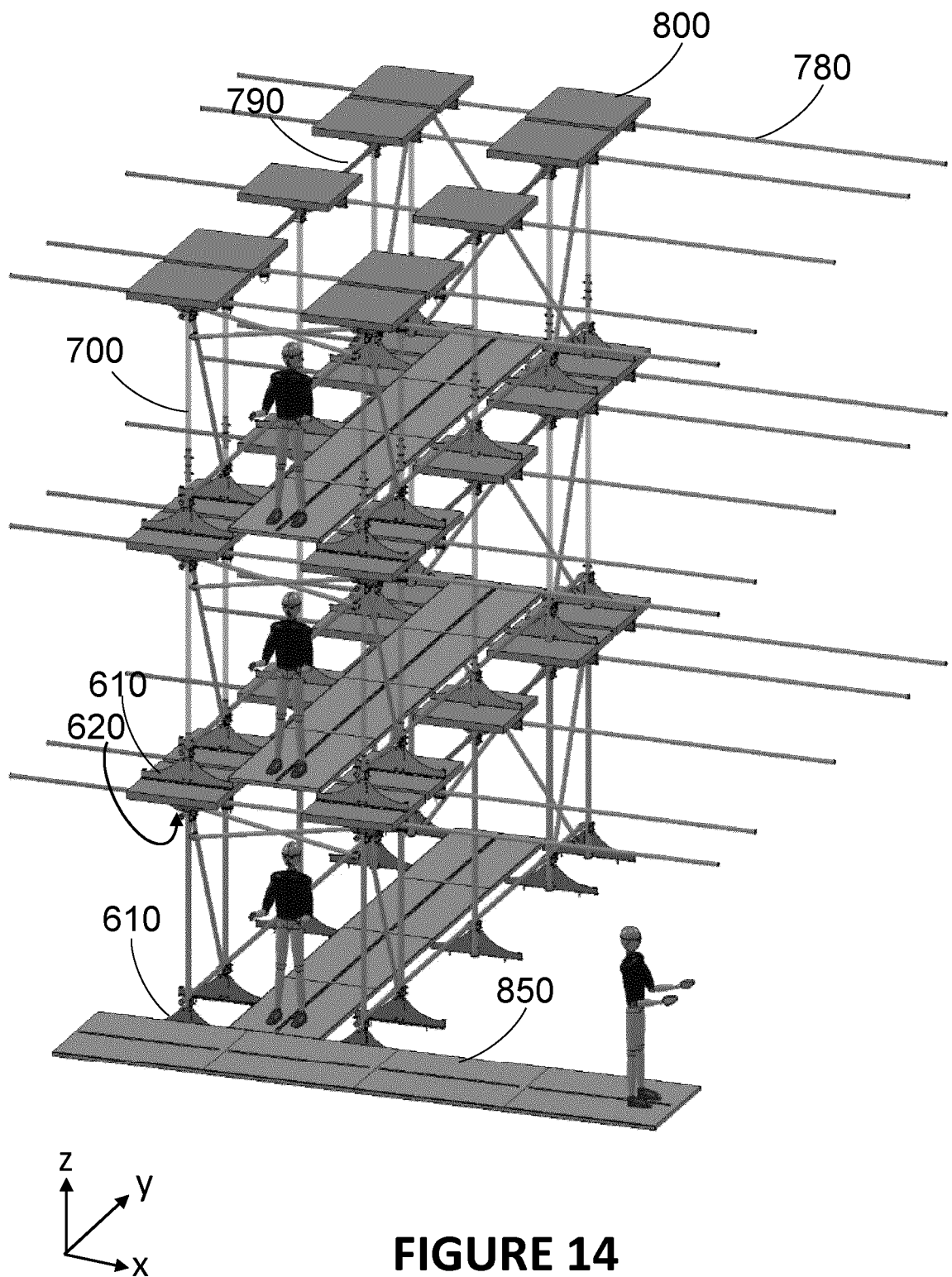

According to an embodiment, the diagonal reinforcing support members 750 are provided only between anchors which belong to a row that extends in the x-axis, i.e., a series of consecutive anchors parallel to the longitudinal axis of the corridor 120 and perpendicular to the rows for passage formed between the racks 200, as shown in FIG. 9. For this reason, the diagonal reinforcing support members 750 are not provided within each row of anchors as these members would block passage through the rows for passage between the racks 200. The diagonal reinforcing support members 750 are therefore present only in the rows of anchors which are near the sides of the module, i.e., the same sides where the input 501 and output 502 of the ventilation ducts 500 are present, or in other words, the first row of anchors and the last row of anchors in the x-direction. This means that the cross (X shape) formed by the diagonal reinforcing support members 750 is not in the way of anyone who would move along the y-axis (transverse axis of the module 100) as they are provided by the walls of the module 100 where no door or passage is present. It should be noted that the first row of anchors in the x-direction (longitudinal axis of the module 100) is not within the racks 200 as it extends along the corridor 120 on the side thereof along the wall and opposed to the racks 200.

According to an embodiment, all the posts 700 in said first row of anchors and all the posts 700 in the said last row of anchors have diagonal reinforcing support members 750 in-between. Additional lateral diagonal reinforcing support members 750 may be provided from the first or last anchors in a row, where such extremal diagonal reinforcing support members 750 would be freely fastened to the ceiling or floor (as shown in FIGS. 6-9).

For the transverse direction, there may also be provided diagonal reinforcing support members 760. Those are provided in a similar fashion within the first pair of posts 700 which are within a given rack 200, and also between the last two posts which are within the same rack 200, as well shown in FIG. 10. In this direction, only one reinforcing support member 760 may be necessary between two posts 700, therefore forming only one diagonal bar (\ or /) in between instead of a full X shape having two crossing mirrored (symmetrical) diagonal bars.

In other words, when considering the rows of anchors in the longitudinal direction (x-axis) of the module 100, only the first and last row comprise diagonal reinforcing support members 750; those are preferably in pair of symmetrically opposed diagonals, forming a X shape, and are provided within each pair of adjacent posts in that row, plus the extremal diagonal reinforcing support members 750 which freely extend with the same shape at both ends. When considering the rows of anchors in the transverse direction (y-axis), all rows comprise such members. Within each row, the first pair of posts 700 that belongs to the rack (typically, the second post and the third post starting from corridor's wall) and the last pair of posts 700 (last post and penultimate post) comprise a diagonal reinforcing support member 760 in-between; typically, a single one is provided.

Figure 15:
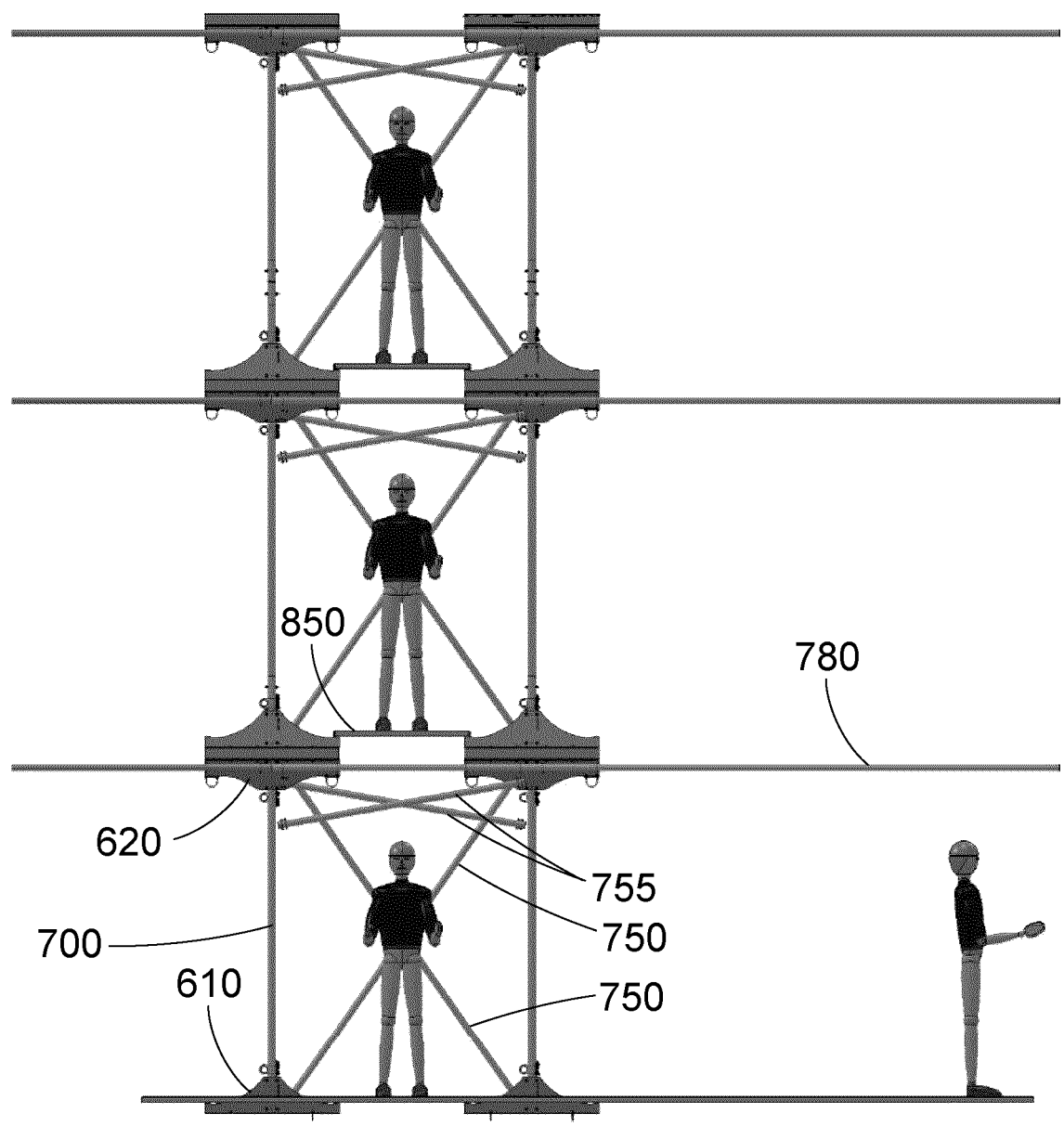
FIGS. 15-17 are a front view, a back view and a side view illustrating the structure of a plant growing module in a stacking arrangement, as in FIG. 12.
Figure 16:
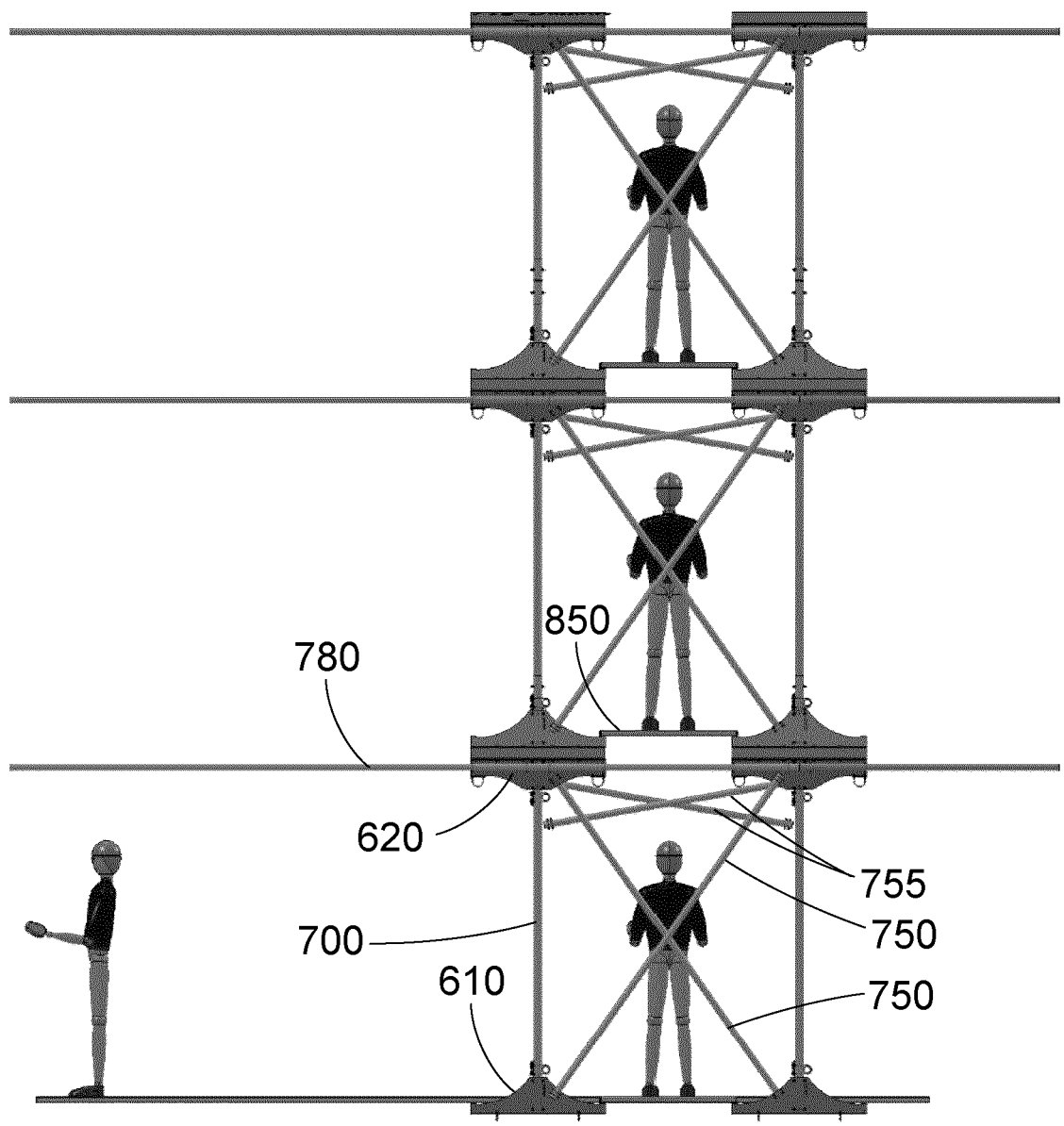
Figure 19:
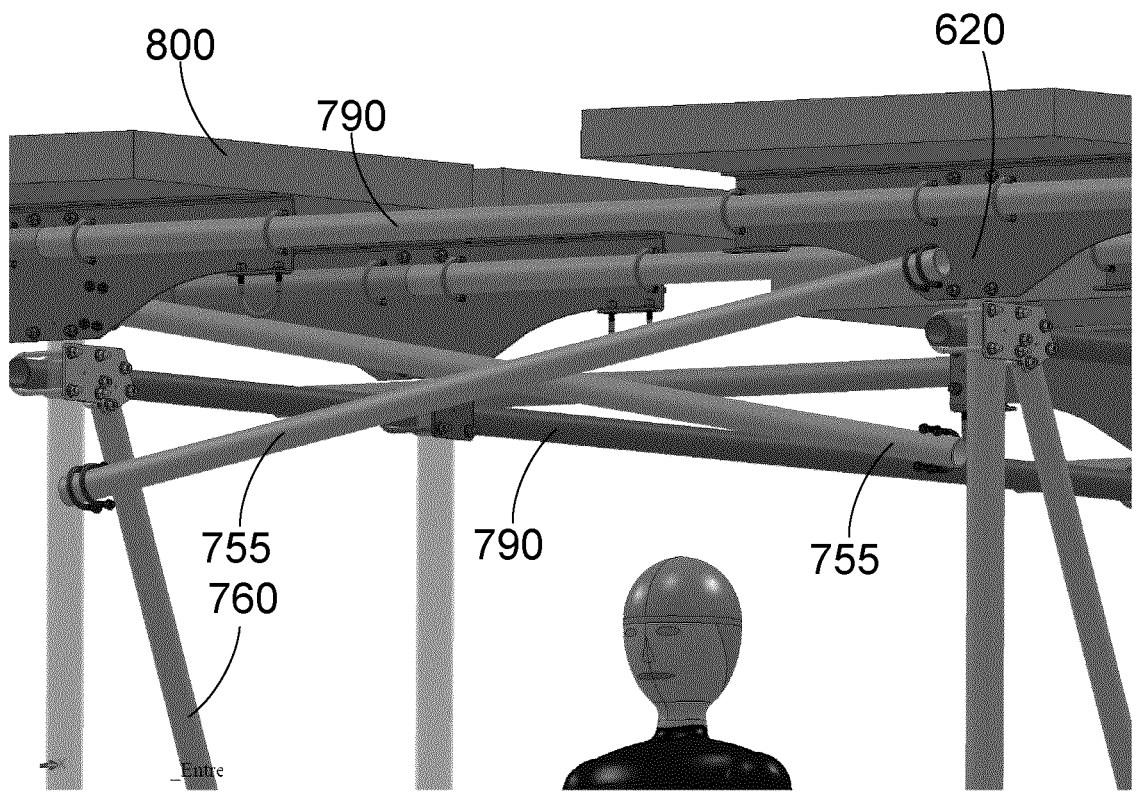

According to an embodiment, and as shown in FIGS. 15-16 and 19, there are additional diagonal reinforcing support members 755 which are fastened at their upper end to the ceiling anchors 620, and fastened at their lower end to an intermediate portion on the posts 700, preferably within the upper half of the posts 700. These additional diagonal reinforcing support members 755 provide additional support and resistance against shearing or torsion forces in the structure.

Although additional reinforcing support members may be added, the configuration described above is a minimal and sufficient structure for the purpose of piling up modules having racks 200 with crops therein.

According to an embodiment, each anchor (610, 620) has a shape of a blade, i.e., it is flat (extends in a vertical plane). The thickness in a direction (such as the y-axis) is significantly smaller compared to the length in the other direction (such as the x-axis). At the top of the ceiling anchor 620 or at the bottom of the floor anchor 610, the anchor may comprise a flat edge or surface for receiving ceiling/floor tiles.

Figure 18:
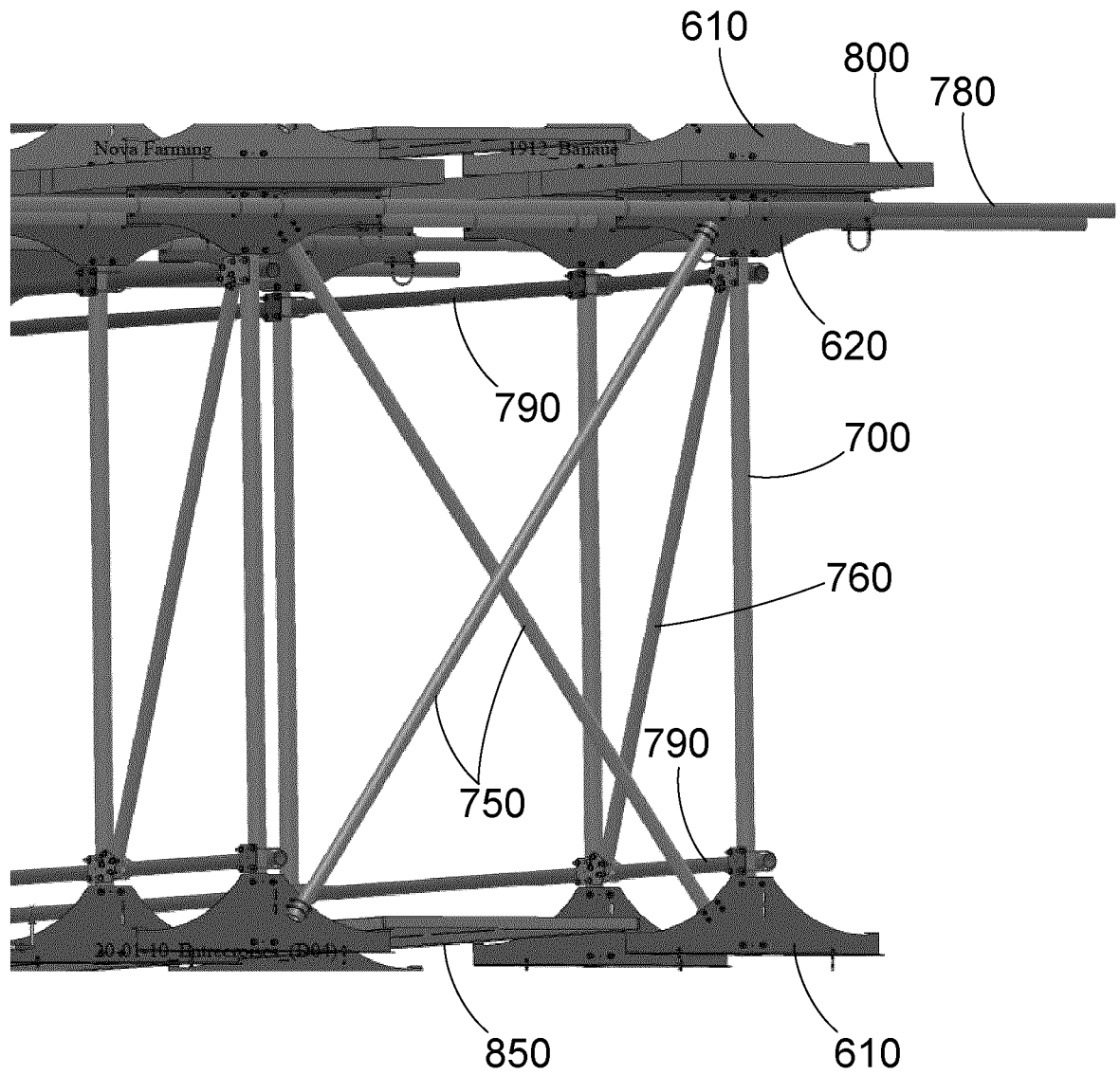
FIGS. 18-19 are close-up views illustrating a structure of a plant growing module, according to an embodiment.

As shown in FIGS. 18-19, the anchor 620 may be flat such as to receive along its side surface the poles forming the posts 700 or the diagonal reinforcing support members 750, 755, 760. When such posts extend along the surface, cables, straps, or any other elongated elements may be used for tightly strapping said poles along the surface, as shown in FIG. 19. Other ways of fastening the poles forming the posts 700 or the diagonal reinforcing support members 750, 755, 760 to the anchors 610, 620 may be contemplated, such as welding, fitting in a pocket or cavity, screwing, bolting, etc.

According to an embodiment, horizontal poles 780 are provided to hold together the anchors belonging to a given row, in the y-axis, or preferably in the x-axis as shown in FIGS. 12-19.

Figure 17:
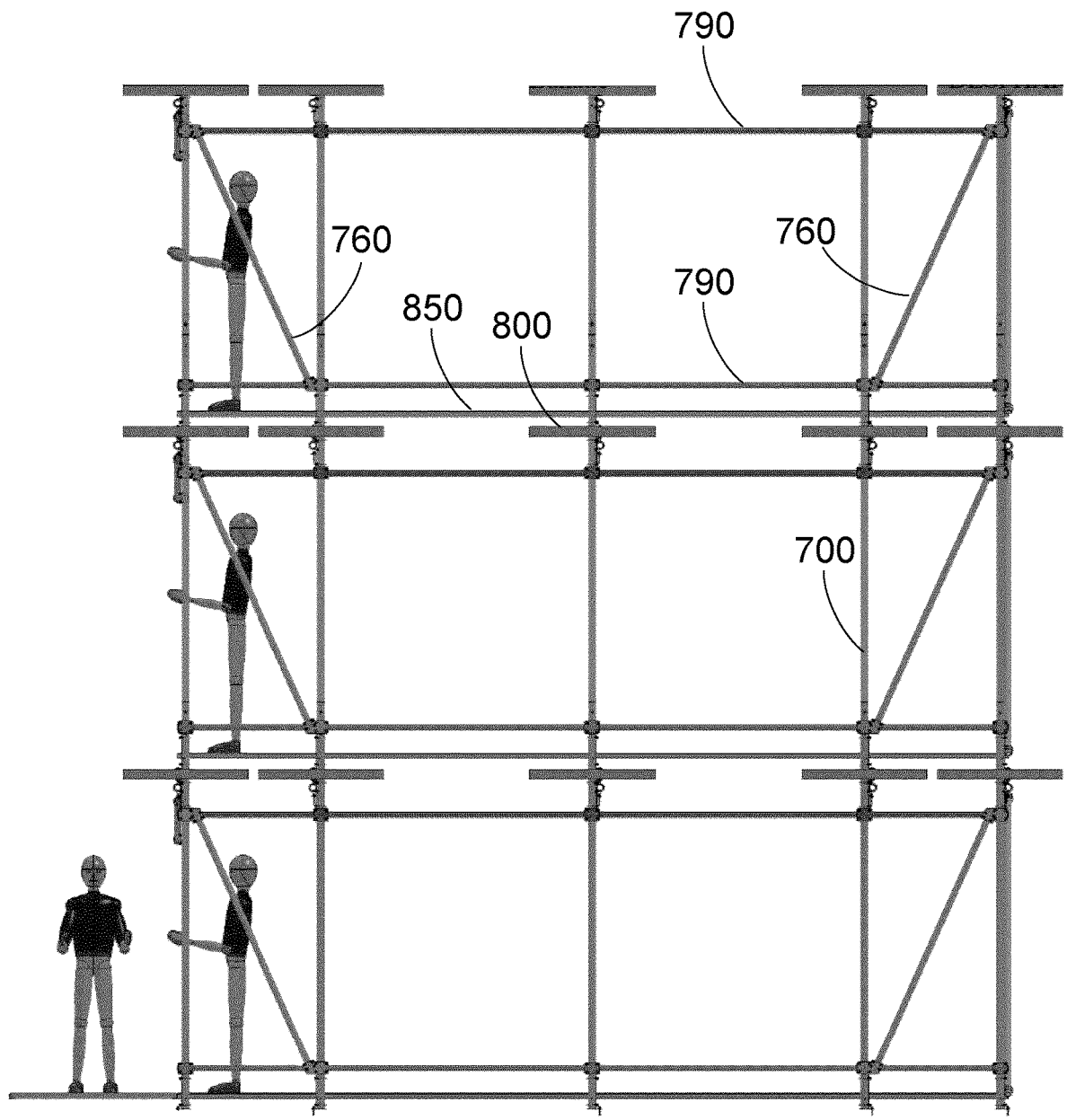

FIGS. 17-19 further illustrate additional horizontal poles 790 which are located slightly below the ceiling anchors 620, or slightly above the floor anchors 610, and hold together the upper portion, or the lower portion, respectively, of the posts 700 belonging to the same row (in the other axis when compared to the horizontal poles 780, therefore respectively: the x-axis, or preferably in the y-axis). According to an embodiment, the additional horizontal poles 790 receive the upper and lower ends of the diagonal reinforcing support members 760, as shown in FIG. 18, and this is why they also extend in the same transverse direction (y-axis).

All poles forming the posts 700 and other elements (750, 755, 760, 780, 790) may be, for example, poles made of aluminum or any other suitable metal, and typically manufactured by an extrusion process.

According to an embodiment, the floor anchors 610 and ceiling anchors 620 comprise fasteners or comprise a feature for receiving a fastener. Moreover, apertures or markings are provided in the ceiling and floor of the modules 100 to indicate the location of the anchor and to allow fastening through the floor or through the ceiling. Therefore, upon installation of a module 100 on the top of another module, or directly on the ground for the lowermost module, the worker installing the module can fasten the modules together (or fasten the module to the ground). For example, the floor anchor of the module 100 being piled up or installed somewhere may be fastened to the corresponding ceiling anchor 620 of the module 100 below, or to the ground, either by screwing, bolting, strapping, attaching, welding, interlocking or any other means for fastening structural elements together.

According to an embodiment, the fastener used between two anchors fastened together leaves a space in-between, as space is reserved for the ceiling and floor of the modules between piled together.

Now referring to FIGS. 12-14 and 18-19, there are shown floor or ceiling tiles 800. According to an embodiment, the tiles 800 constitute the separating surface between two consecutive modules 100 stacked above each other, such that the ceiling and the floor is made by the same tiles, thus reducing the overall weight and quantity of materials needed for building the multi-modular facility. The tiles 800 may be provided to cover the whole separating surface to ensure a physical barrier between the modules 100 provided one on top of another, to ensure that warm air does not travel upwardly between different modules, which would complicate the ventilation parameters and heat management. A proper separation ensures that each unit has approximately the same temperature despite the different height of each module.

According to an embodiment, the tiles 800 are not structural tiles, as they cannot support substantial weight. Now referring to FIGS. 11-18, there is shown a catwalk 850 which constitutes a structural way of passage for people within the modules 100. The catwalk 850 is distinct from the tiles 800, and is typically more solid, e.g., made of a metallic structure such as steel of aluminum panels.

As shown in FIG. 18, the floor anchors 610 comprise an elongated portion, which can be on both sides thereof, defines a top surface on which the catwalk can lay, and onto which it can be fastened. The catwalk is laid onto a plurality of floor anchors 610 forming adjacent parallel rows. By laying on a plurality of anchors within the corridor 120 or within an inter-rack row, the catwalk 850 may advantageously offer a dedicated walking support on the corridor (FIGS. 12-14) on in a row within the racks 200 (FIG. 11 specifically, and also shown in FIGS. 12-14).

The presence of catwalks 850 ensures that the structure described herein formed by various poles and their anchors is the structure that supports the weight of the people travelling inside the various modules. The walls of the modules 100 therefore do not need to be structural walls (i.e., they do not support any load/are not load-bearing) and can be much simpler to build as they act only as partition walls and not as structural walls. The tiles 800 do not receive people, do not need to bear their weight and also do not need to be as solid as a structural floor, thus making the tiles 800 much simpler (simply partition tiles).

If modules are stacked, independent staircases may be built on the outside of the modules 100 to access the corridor 120 of each module 100.

Figure 20:
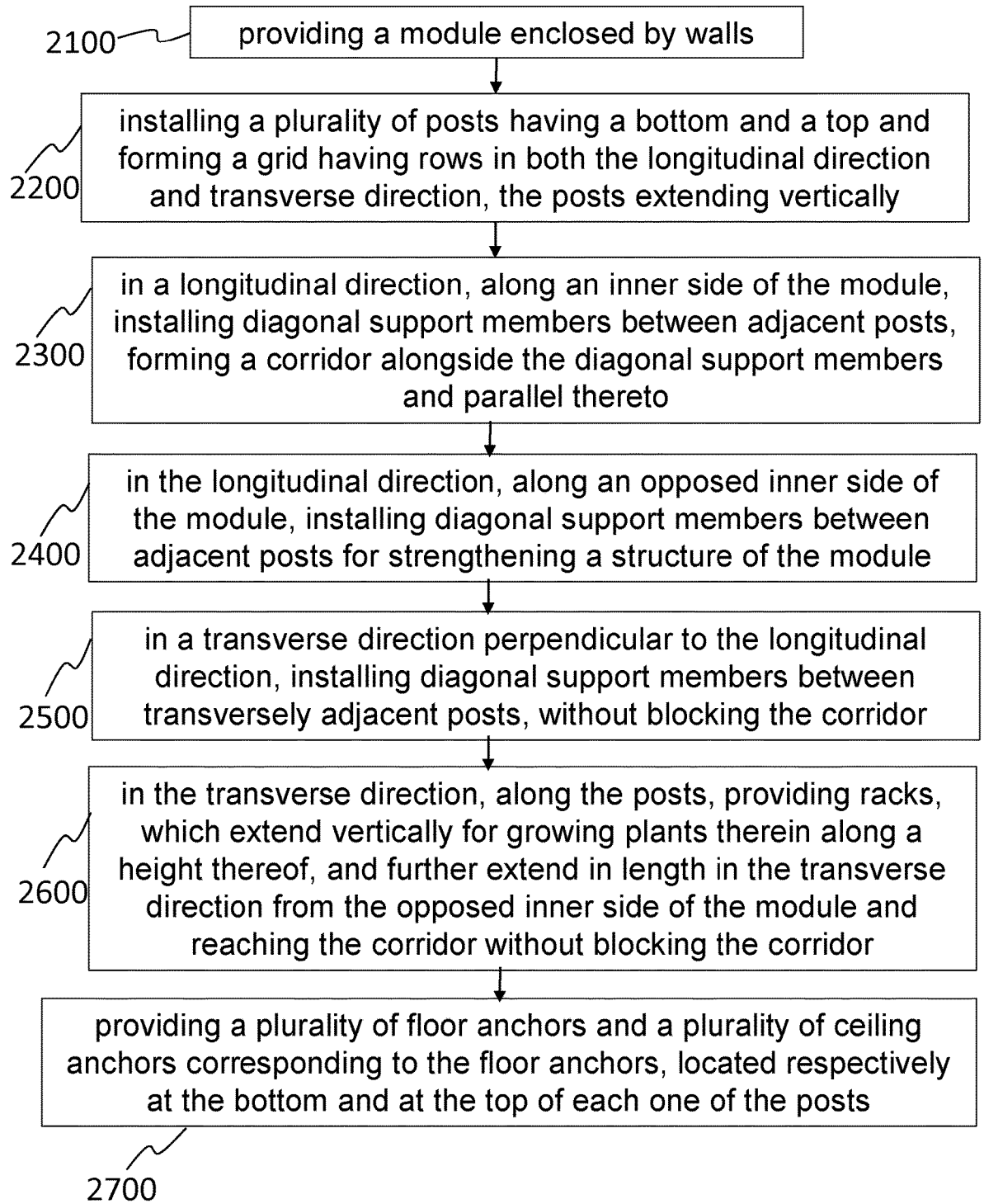
FIG. 20 is a flowchart illustrating a method for building and operating a plant growing facility comprising racks and lighting walls forming rows, according to an embodiment.

As shown in FIG. 20, the module 100 for vertical farming can be installed as follows:

Step 2100—providing a module enclosed by walls;

Step 2200—installing a plurality of posts having a bottom and a top and forming a grid having rows in both the longitudinal direction and transverse direction, the posts extending vertically, Step 2300—in a longitudinal direction, along an inner side of the module, installing diagonal support members between adjacent posts, forming a corridor alongside the diagonal support members and parallel thereto;

Step 2400—in a longitudinal direction, along an opposed inner side of the module, installing diagonal support members between adjacent posts for strengthening a structure of the module;

Step 2500—in a transverse direction perpendicular to the longitudinal direction, installing diagonal support members between transversely adjacent posts, without blocking the corridor;

Step 2600—in the transverse direction, along the posts, providing racks, which extend vertically for growing plants therein along a height thereof, and further extend in length in the transverse direction from the opposed inner side of the module and reaching the corridor without blocking the corridor; and Step 2700—providing a plurality of floor anchors and a plurality of ceiling anchors corresponding to the floor anchors, located respectively at the bottom and at the top of each one of the posts.

Reference is now made to FIGS. 21-38, which relate to another embodiment for arranging the vertical farming systems, i.e., the racks 200 described above as forming rows may be arranged in another manner, as described below, regardless of the structure permitting multi-level stacking of modules.

Figure 21:
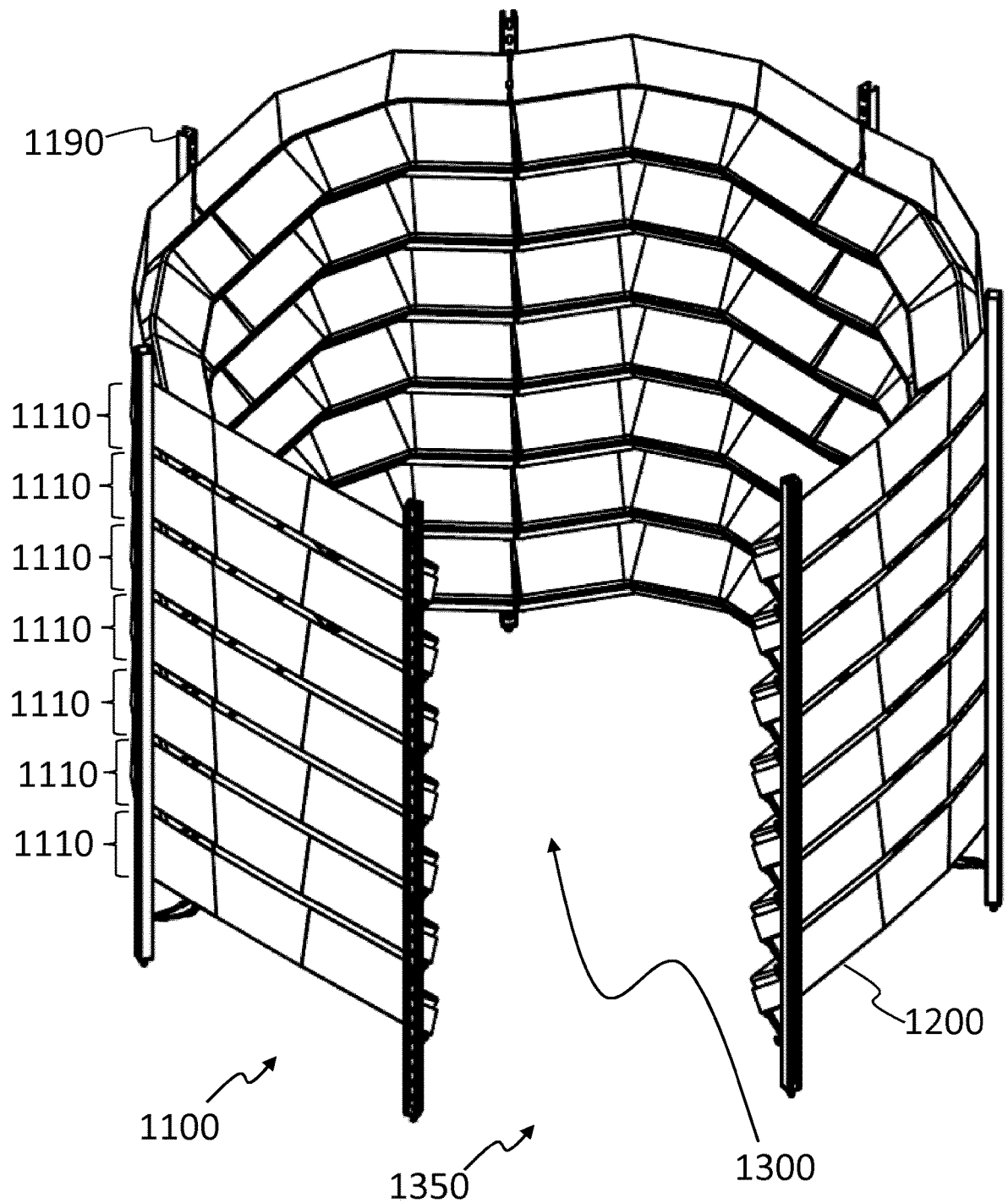
FIG. 21 is a perspective view illustrating the system for plant growth, according to an embodiment of the invention.

Referring to FIG. 21, there is shown a plant production vertical system 1100, which is a substantially cylindrical (or polygonal) rack, comprising a plurality of plant production units 1200 which are modular. According to an embodiment, the plant production vertical system 1100 comprises a plurality of stages 1110, or levels, which are located one above the other to form a tower, hence the description as vertical farming. The annular shape of each stage 1110 (including a break in the ring at a consistent position of each stage to allow for passage) forms a silo inside which illumination is provided for growth.

According to an embodiment, each stage 1110 has a substantially annular shape, each plant production unit 1200 being arranged next to another one and together forming a ring all around a central space 1300 which is devoid of devices, units or plants. Since the stages 1110 are arranged one on top of the other, the central space 1300 also extends vertically along a central longitudinal axis 1301, identified in FIG. 22, which is in the center of the ring defining each stage 1110 and which is vertical. The vertically extending central space 1300 is therefore a volume, which is free, in the center of the plant production vertical system 1100; it forms an inside lumen inside the system 1100, which can therefore be viewed as a tower or a silo.

This central space 1300 serves at least two purposes. First, illumination is required for plant growth, and the central space 1300 allows direct lighting onto the plants which live by the central space 1300. Second, it allows people or instruments to stand in the central space 1300 and perform operations on the plants, such as picking, visually inspecting or measuring the leaves of the plants or the fruits they bear, for example.

In order to let a person come into the central space 1300, a door opening 1350 can be provided. As shown in FIGS. 21-24, the door opening 1350 can be provided by having each of the stages 1110 break, i.e., not completely surround the central space 1300, by not including one or a few units that would be needed to make the stage 1110 completely annular. Instead, each stage 1110 is a ring with a missing arc of circle. By making sure that the "missing" portion of each stage is vertically aligned, the result is that the plurality of piled-up stages 1110 create a vertically aligned missing portion which forms a door opening 1350.

The exact configuration can be arranged to fit the particular needs of the facility. For example, if the system 1100 is very high such as to be taller than most people's height, than the door opening 1350 does not need to be taller than the people it is expected to allow and the higher stages 1110 in the system 1100 can be completely annular (no missing portion) such that the higher stages form a complete ring and the door opening 1350 has a finite height not reaching the top of the system 1100. This would mean that the higher stages can bear more plants because no space needs to be reserved for human passage.

According to a preferred embodiment, a door 1355 is provided onto the door opening to provide a door for the system 1100, in order to keep the system 1100 as a closed silo by default. When a person needs to access the central space 1300, he or she only needs to temporarily open the door 1355 for that purpose. FIGS. 25-26 or 27-28 show the door 1355 because either closed or open. Optionally, the door inside surface may comprise plants (grown in units 1200) just like the other walls.

Figure 25:
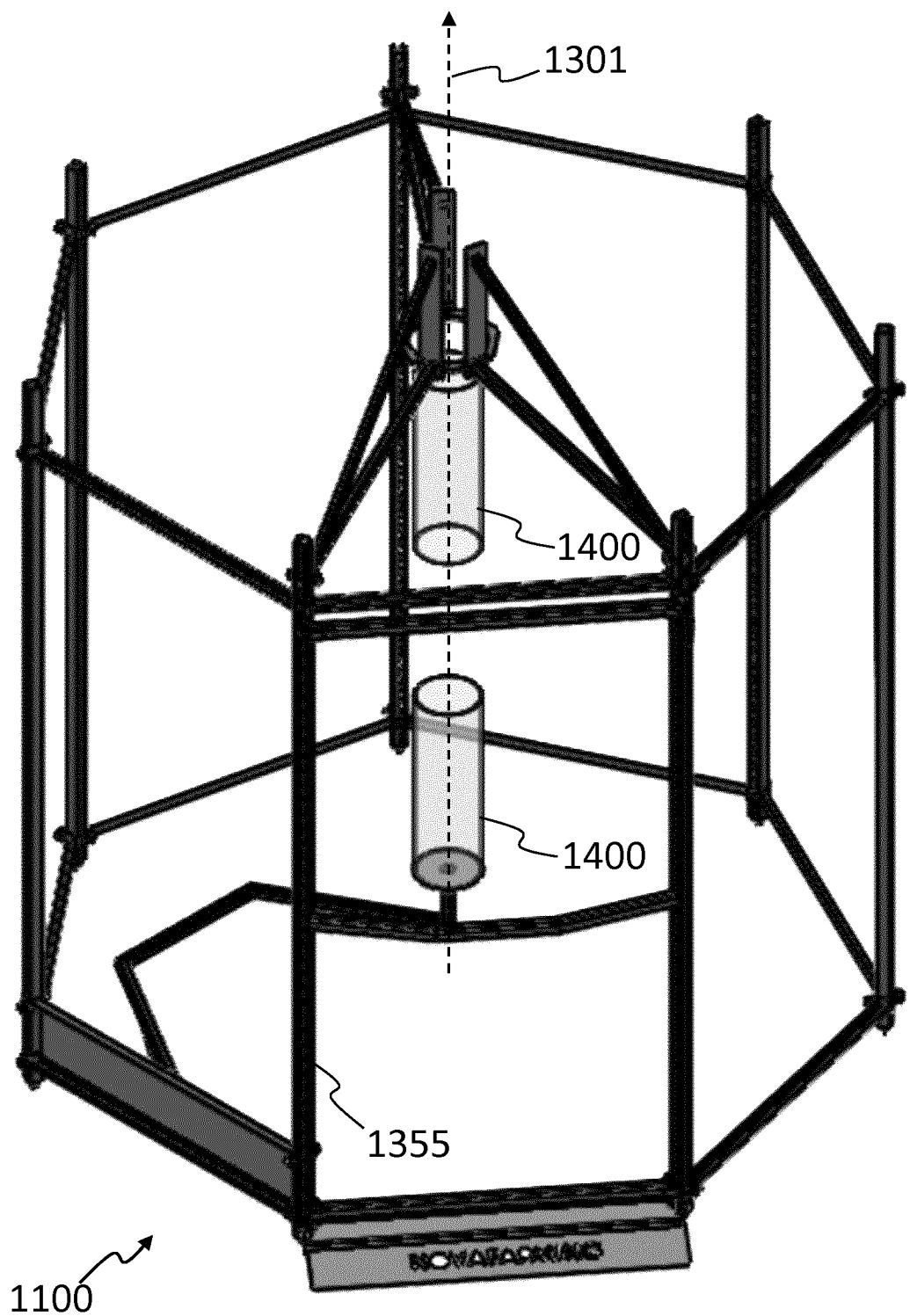
FIG. 25 is a perspective view illustrating the system for plant growth, according to an embodiment of the invention.
Figure 26:
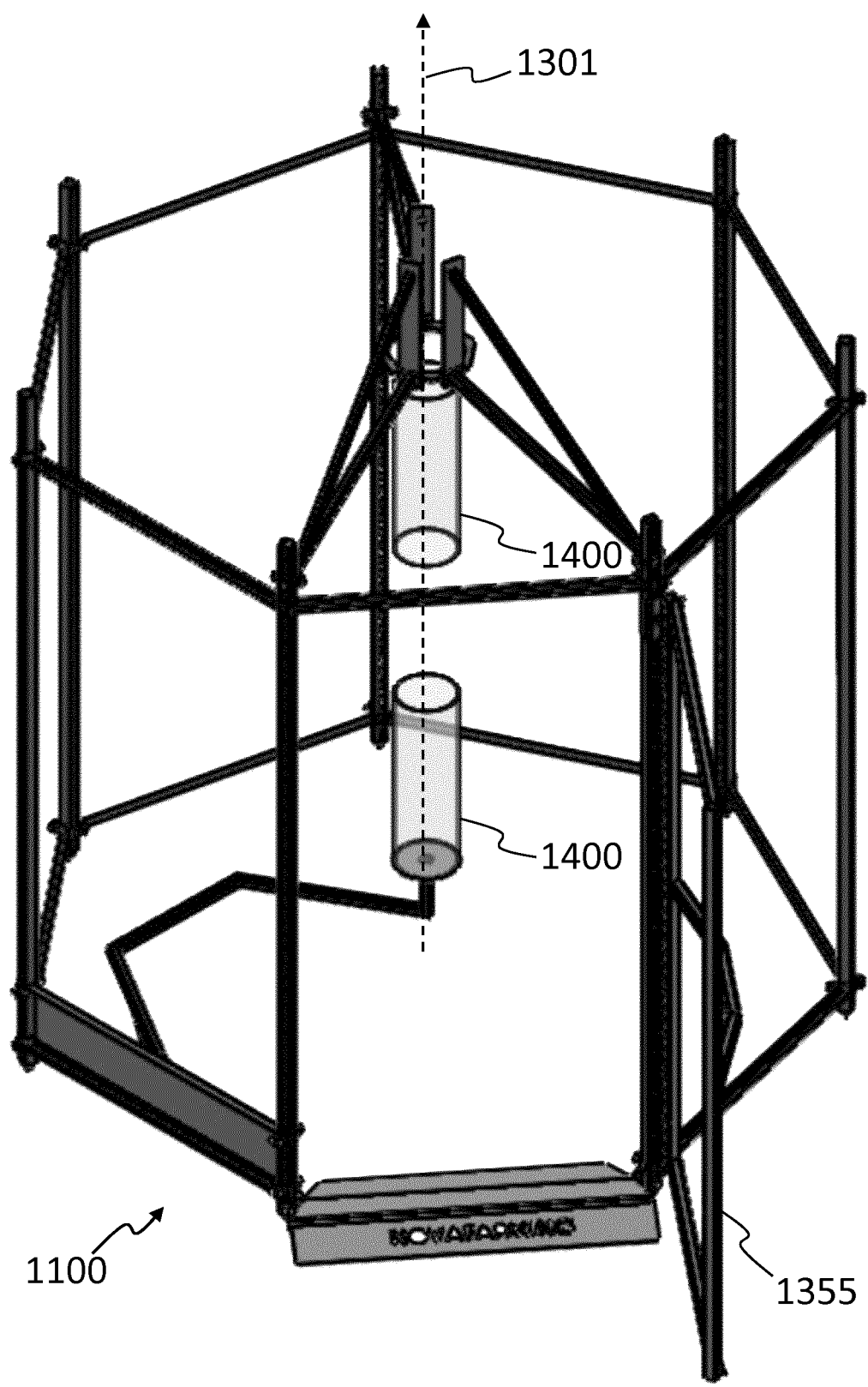
FIG. 26 is a perspective view illustrating the system of FIG. 25, with the door opened.
Figure 27:
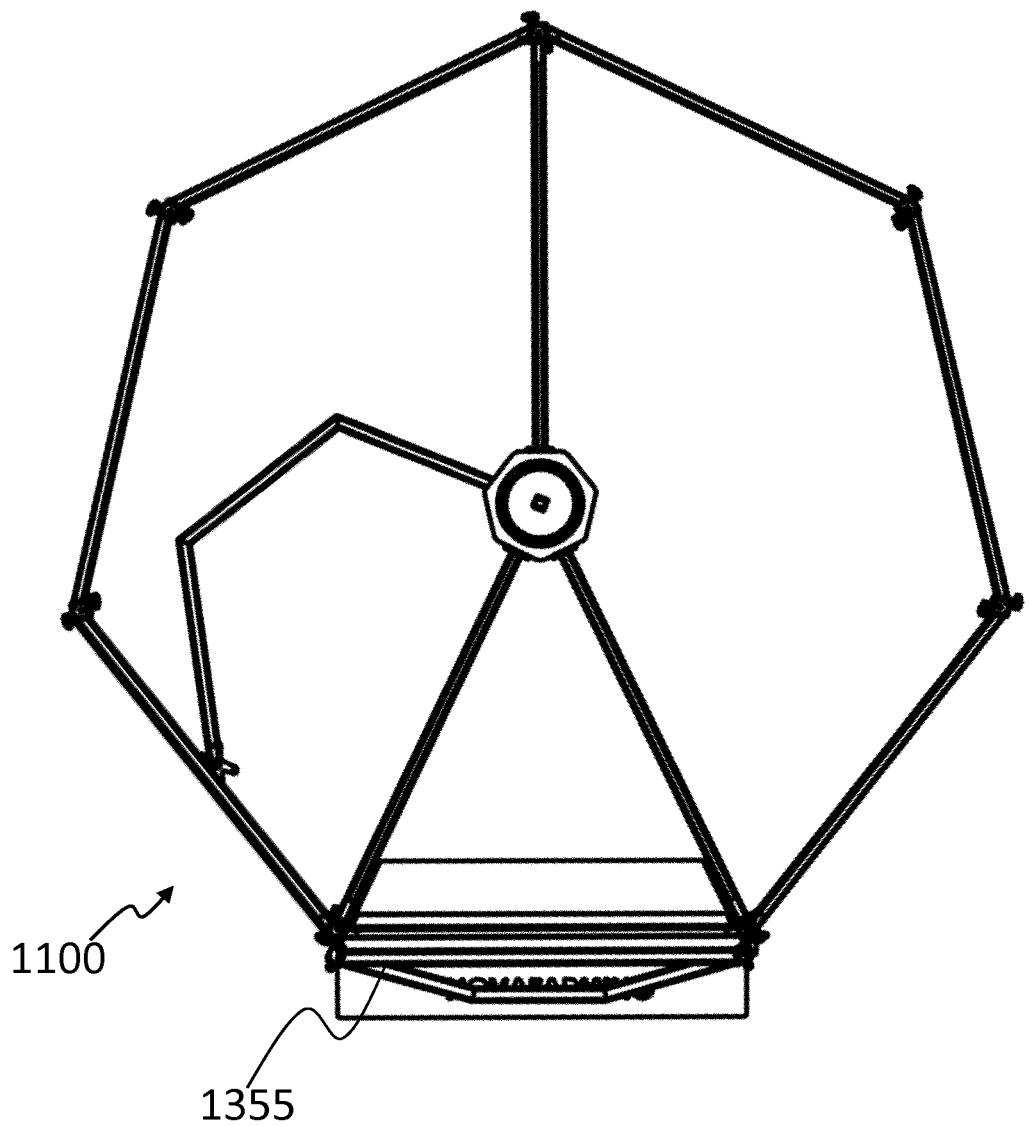
FIG. 27 is a top view illustrating the system of FIG. 25.
Figure 28:
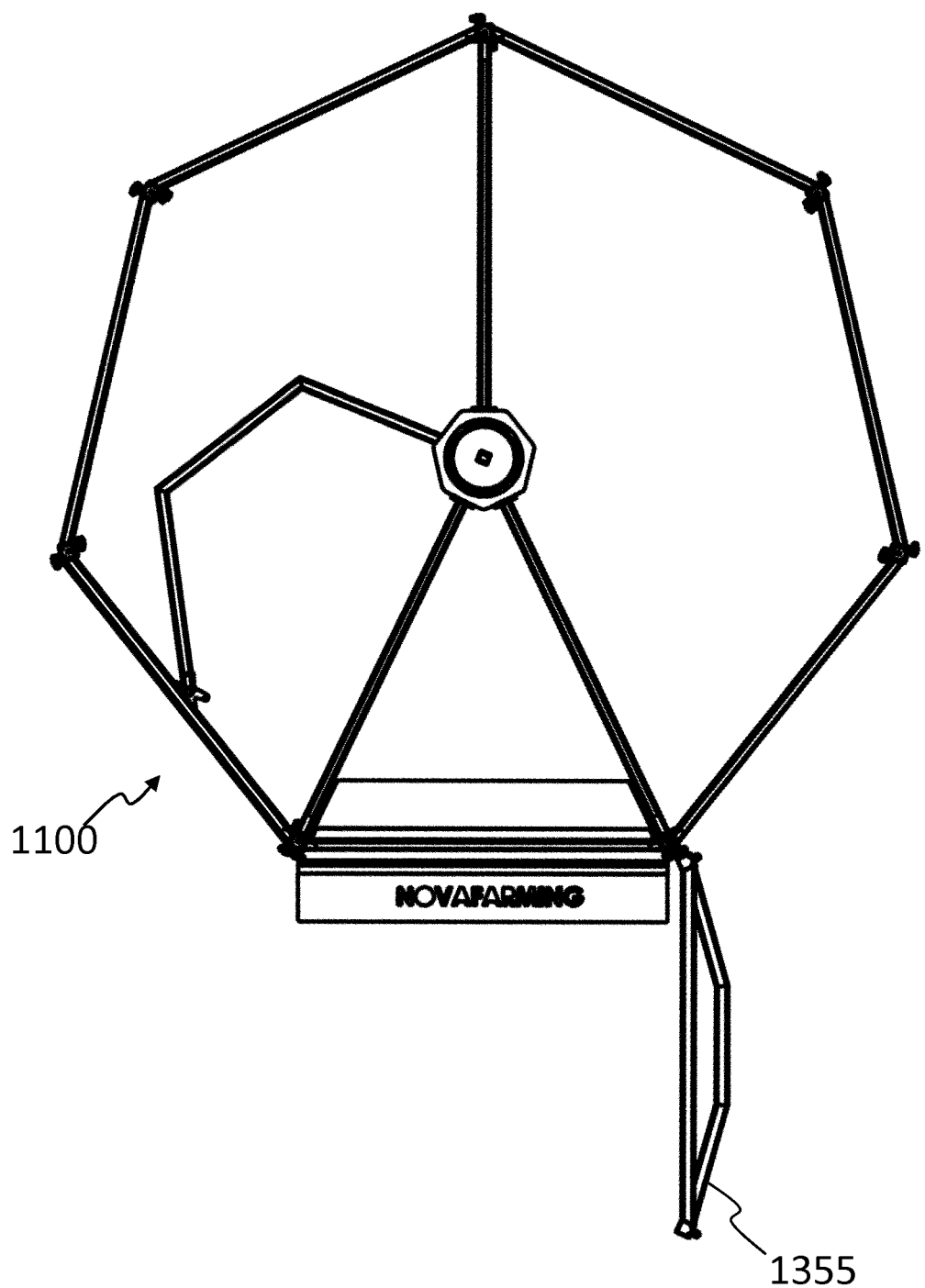
FIG. 28 is a top view illustrating the system of FIG. 26, i.e., with the door opened.
Figure 29:
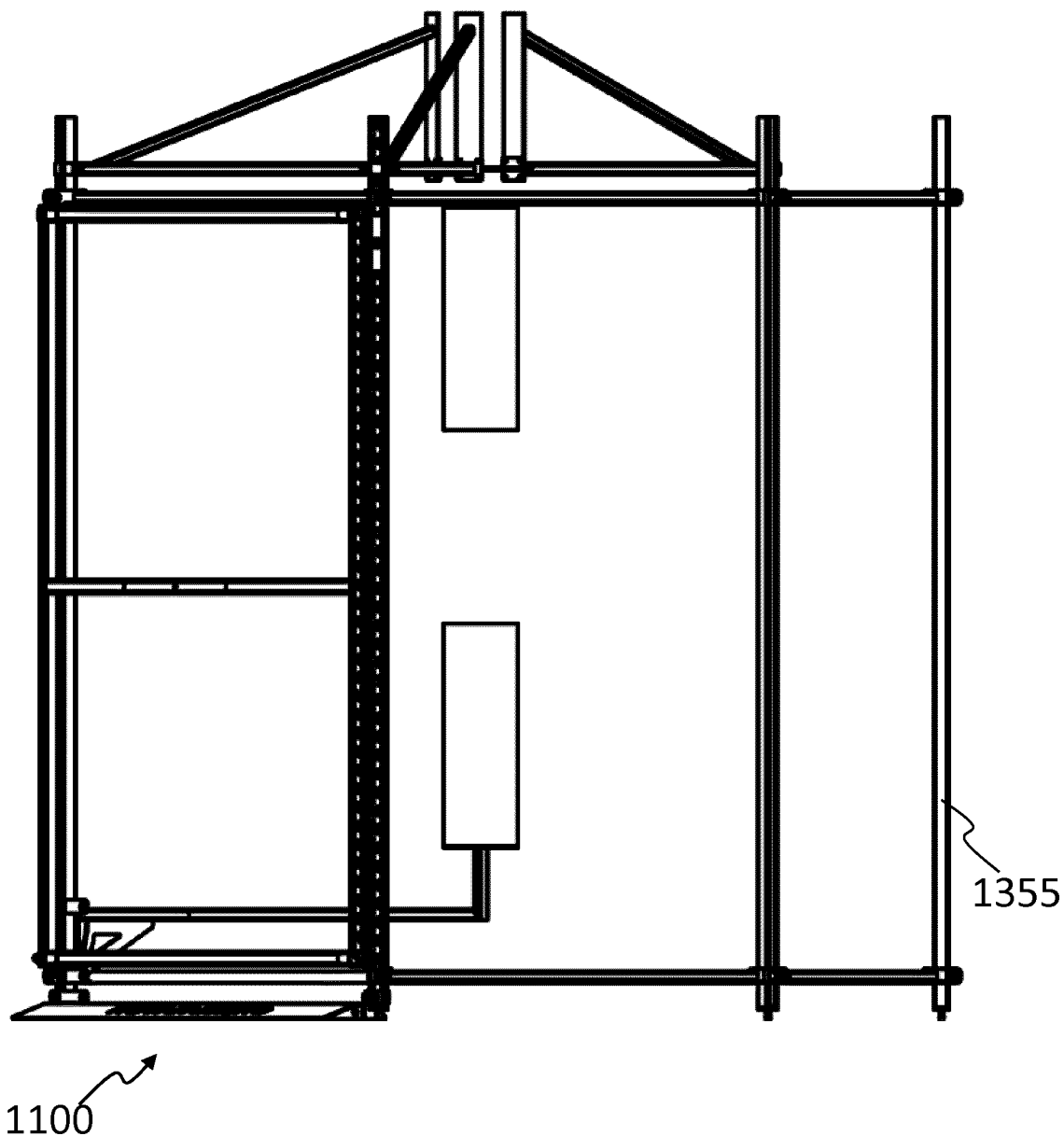
FIG. 29 is a front view illustrating the system of FIG. 25.
Figure 30:
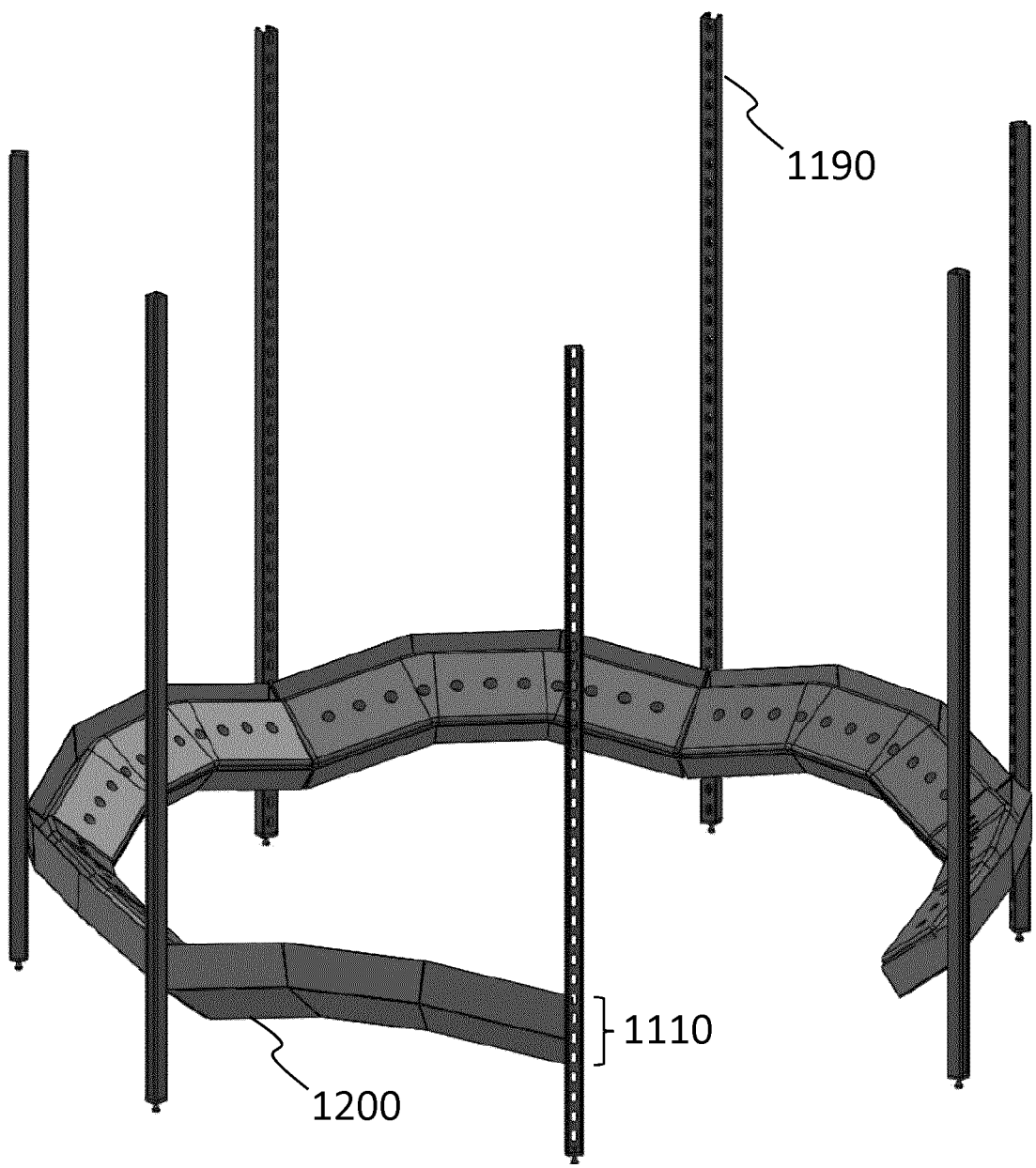
FIG. 30 is a perspective view illustrating the system for plant growth with a single stage shown on the frame, according to an embodiment of the invention.
Figure 31:
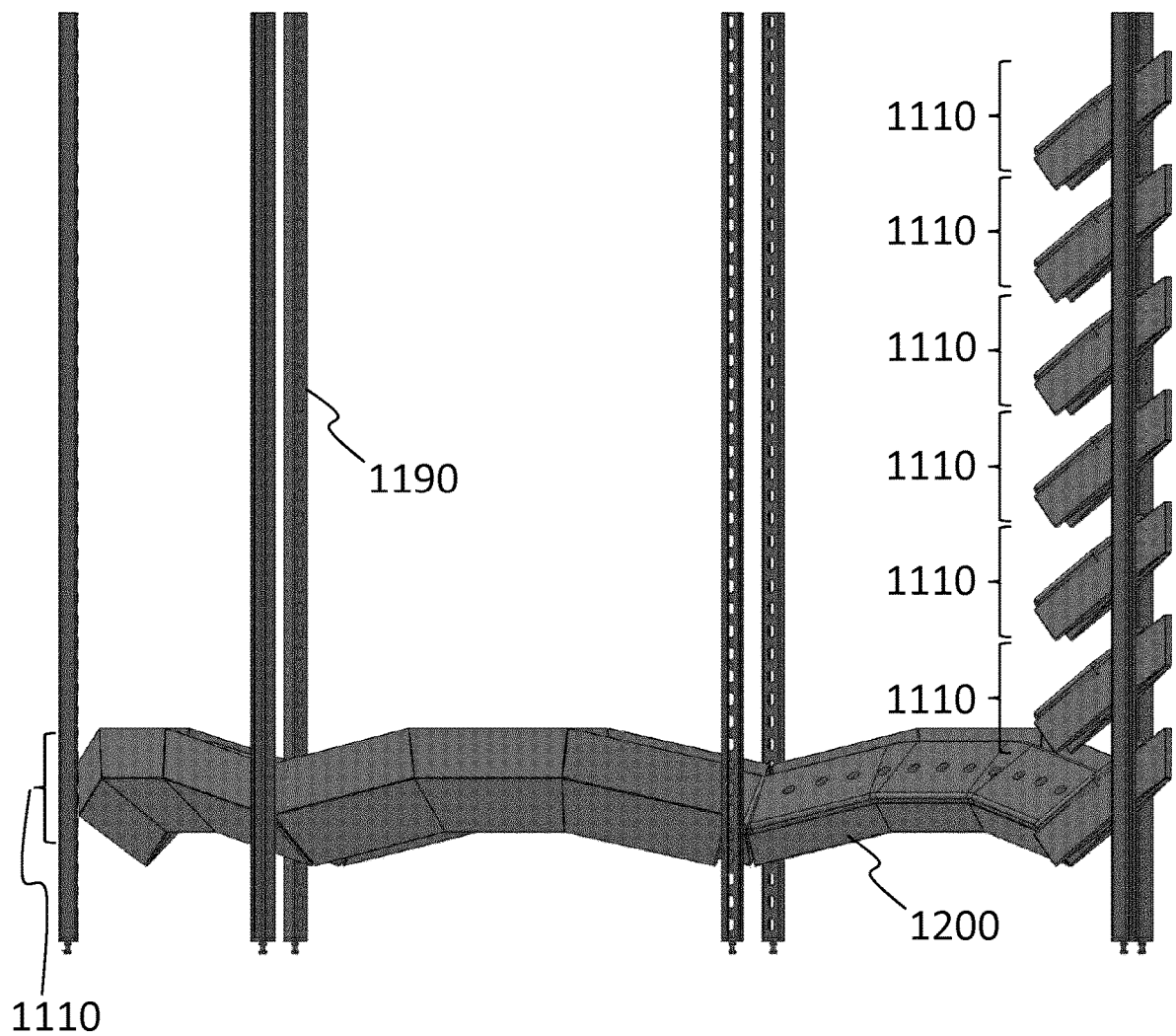
FIG. 31 is a side view illustrating the system for plant growth with a single complete stage shown on the frame and one representative unit for all other stages, according to an embodiment of the invention.

FIGS. 25-26 further show the illumination system 1400. The illumination system 1400 is preferably provided in the central space 1300, preferably along the central longitudinal axis 1301 thereof. By using a lamp having a 360° coverage all around, the illumination can reach all the units of a given stage. To ensure that all stages receive a sufficient amount of light over a period, the illumination system 1400 can comprise a lamp having a significant longitudinal length that extends along the central longitudinal axis 1301, and/or can comprise a plurality of lamps. For example, FIGS. 25-26 and 29 show that there are two lamps, one by the bottom and the other by the top of the system 1100, and each lamp covers a non-negligible length along the central longitudinal axis 1301.

According to an embodiment, the illumination system 1400 comprises lamps having LEDs (light-emitting diodes). More advantageously, this LED lamp should comprise the feature of wavelength modulation of the emitted light power. This means that there should be a controller which controls the emitted light power at a given wavelength or a given wavelength range. This can be advantageous in combination with an algorithm that determines which wavelengths or wavelength rangers would be the most advantageous for the plants at a given stage of their life, since the beneficial wavelengths may change whether the plant needs to grow its roots, its leaves, its flowers or its fruits. Since LEDs can be designed to emit at a particular wavelength, combining a plurality of LEDs of appropriate wavelength into a lamp makes this lamp suitable for spectral evolution of the emitted light over the course of plant growth.

The same considerations can be taken into account to control the nutrients that are dispensed to the plants in the system 1100. The nutrients can be dispensed according to the specific needs of the plants, which can change upon the plant's lifetime.

In order to form the system 1100, there is provided a frame 1190, shown for example in FIGS. 21-22 and 30-31, which comprises poles for securing the units 1200.

Figure 33:
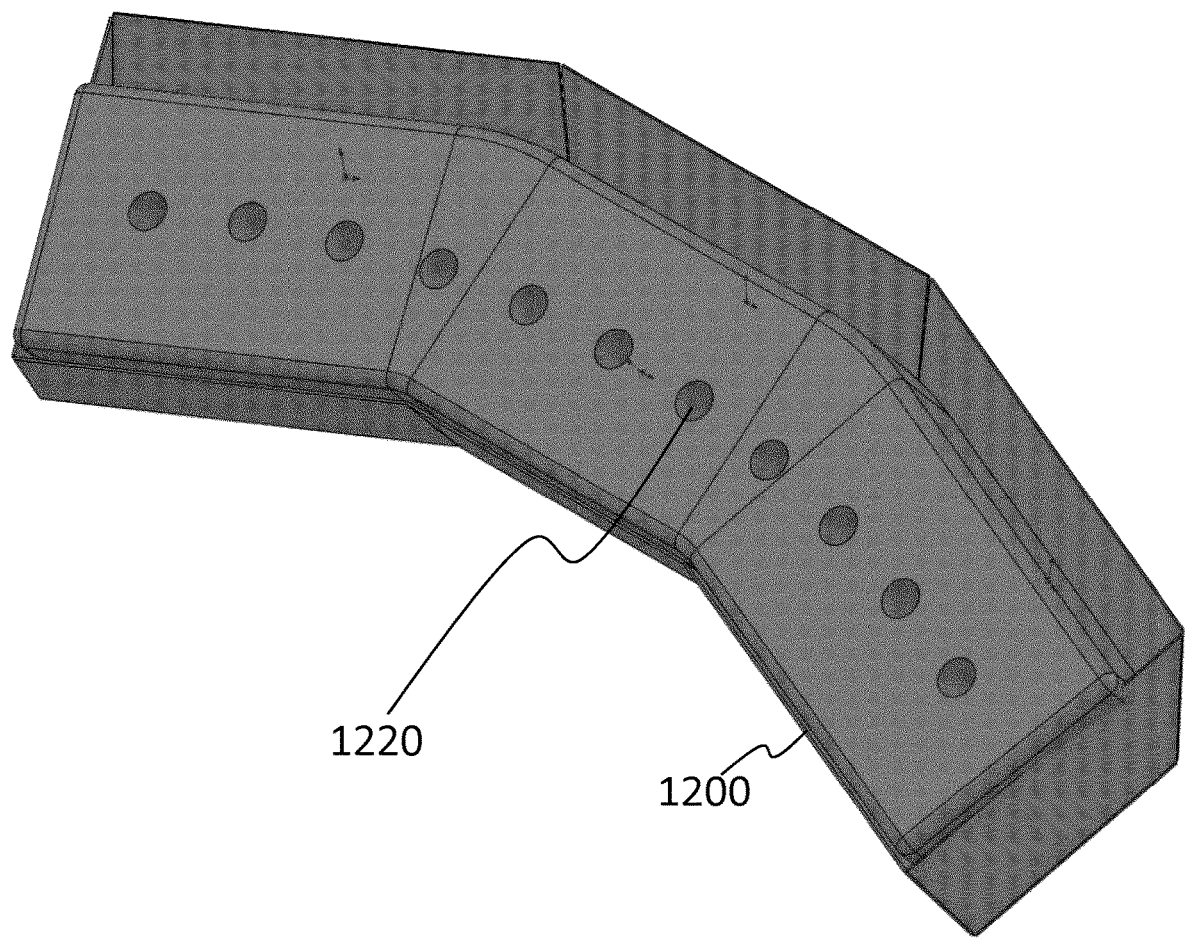
FIG. 33 is a perspective view illustrating a unit for the system for plant growth, according to an embodiment of the invention.

FIG. 33 shows a single unit 1200, which can also be referred to as a module since the units 1200 can be arranged individually onto the system 1100 in a modular fashion such that each stage 1110 forms an almost complete ring around the central space 1300.

Figure 23:
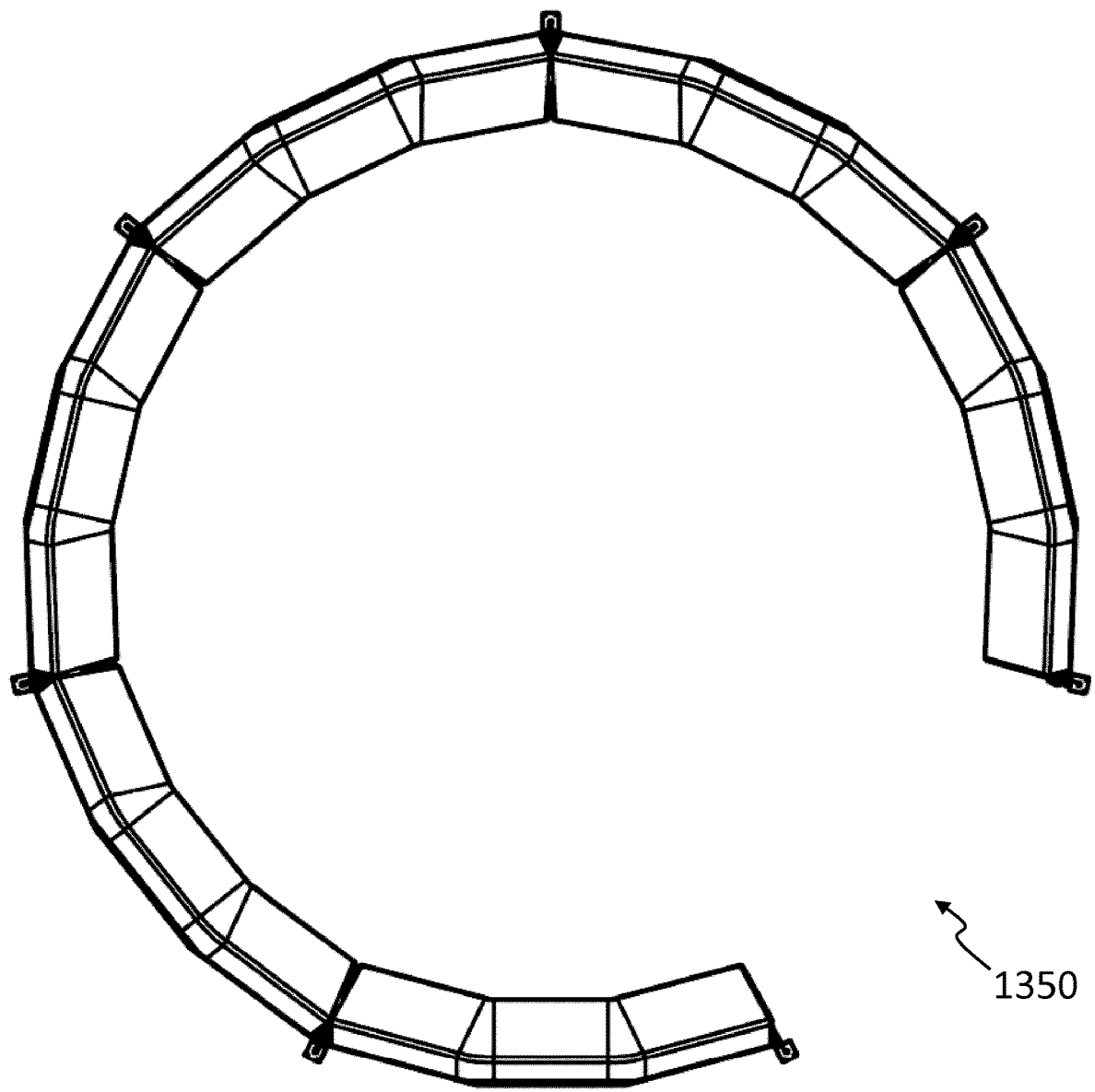
FIG. 23 is a top view illustrating the system of FIG. 21.
Figure 24:
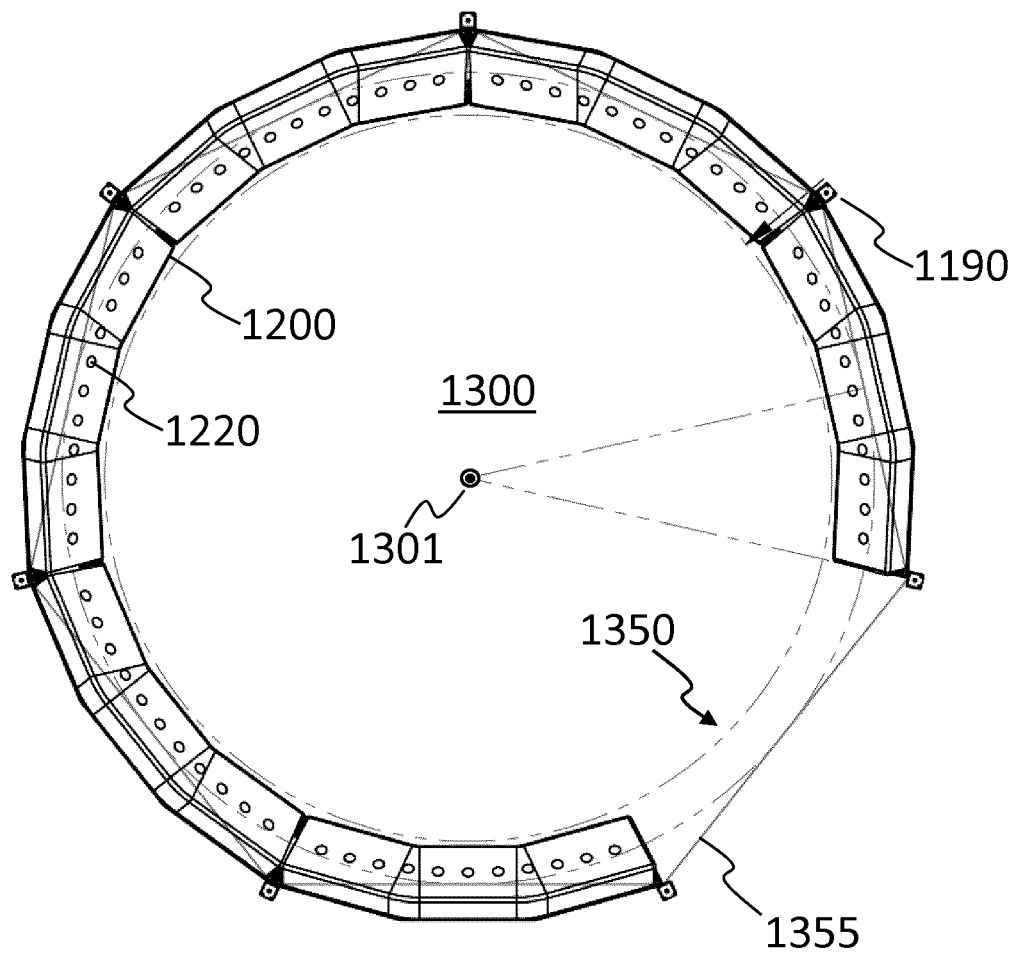
FIG. 24 is a top view illustrating the system for plant growth including plant apertures, according to an embodiment of the invention.
Figure 32:
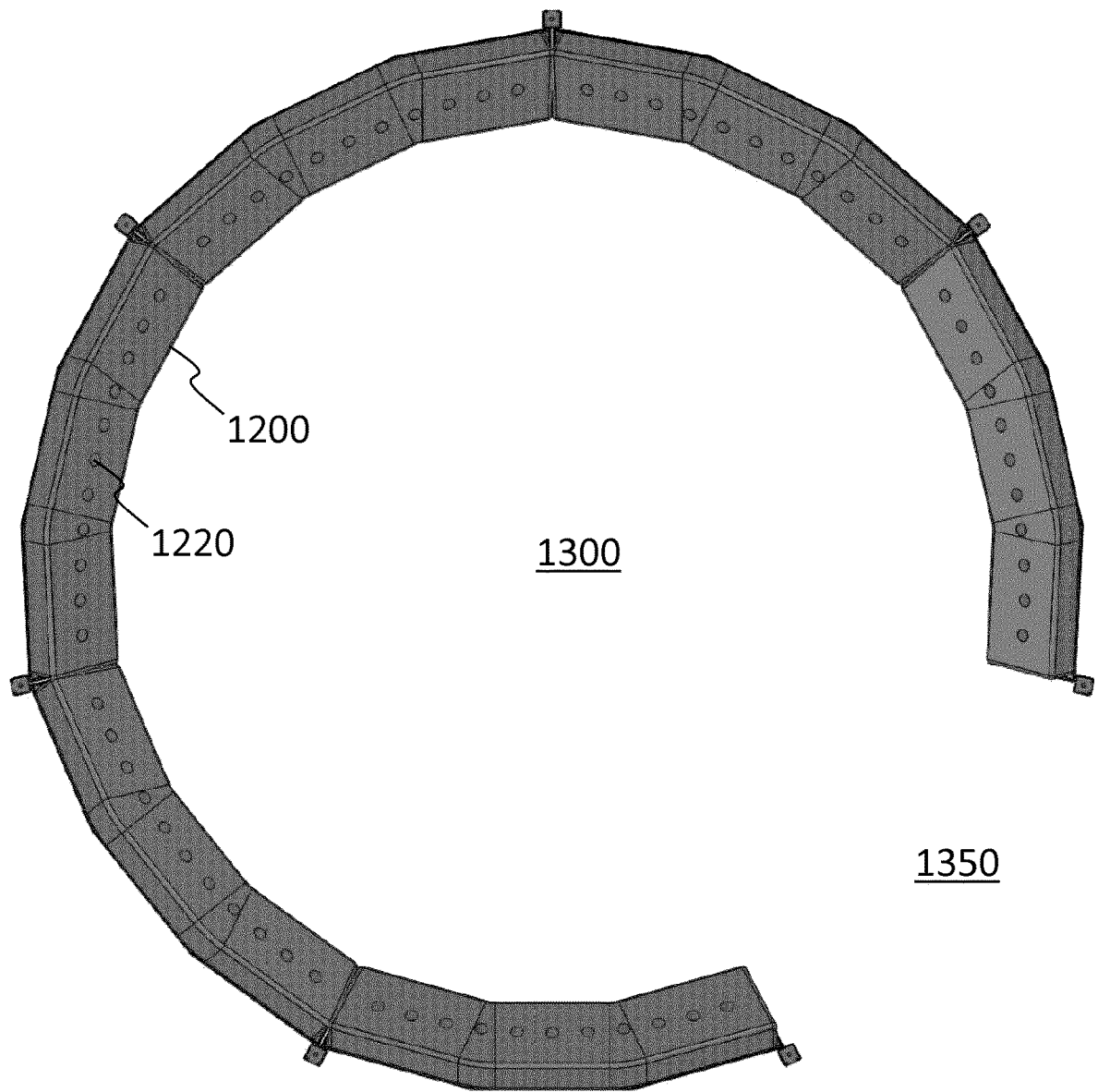
FIG. 32 is a top view illustrating a stage of the system for plant growth, according to an embodiment of the invention.

Each unit 1200 should cover an arc of circle, such that a series of adjacent units 1200 in a stage 1110 form a ring, with a missing portion if a door opening 1350 is provided, as shown in FIGS. 23, 24 or 32. The unit 1200 can have an arc-of-circle shape per se, or can be made of a plurality of segments (such as straight segments) which have an angular offset with respect to the neighboring segment such that together, they have a rough shape of an arc of circle, as shown in FIG. 33, where the unit 1200 is curved because it is made of three straight segments that approximate an arc of circle.

Figure 34A:
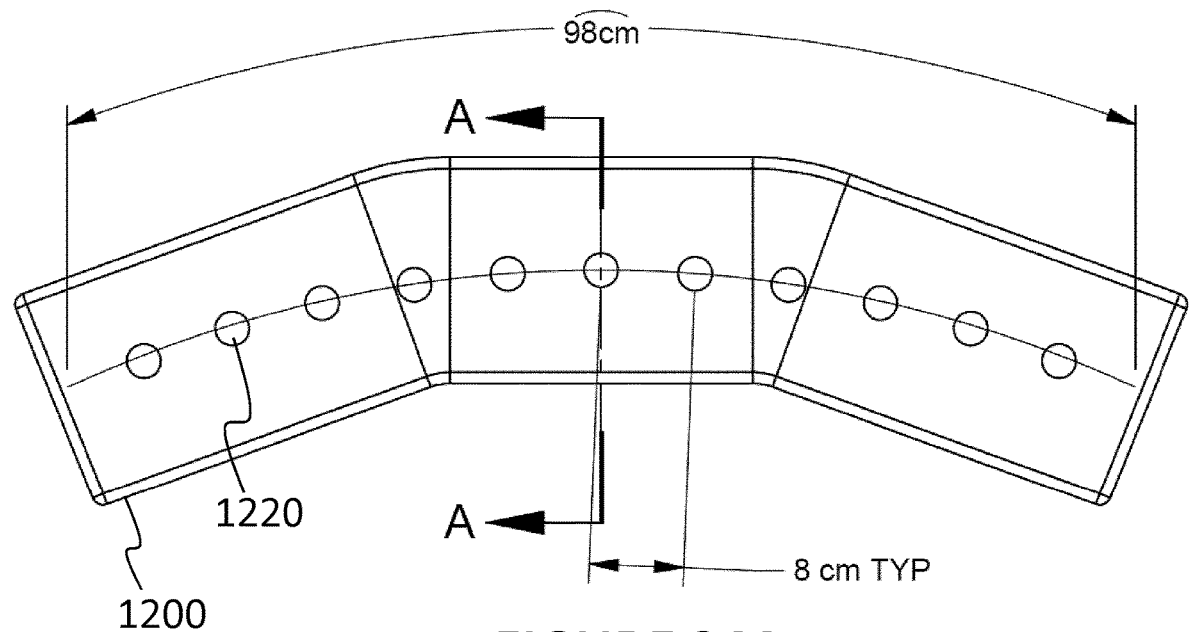
FIGS. 34A-34B are a top view and a corresponding cross-section illustrating a unit for the system for plant growth, according to an embodiment of the invention.
Figure 34B:
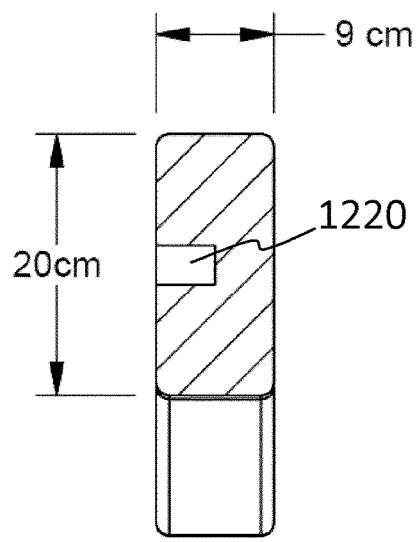

Each unit 1200 comprises apertures 1220 on a surface thereof, thus defining an area dedicated to plant seeding and growing, as shown in FIG. 33. The top view and cross-section of FIGS. 34A-34B show that the apertures 1220 are regularly spaced apart and reach a depth inside the unit 1200.

Figure 35:
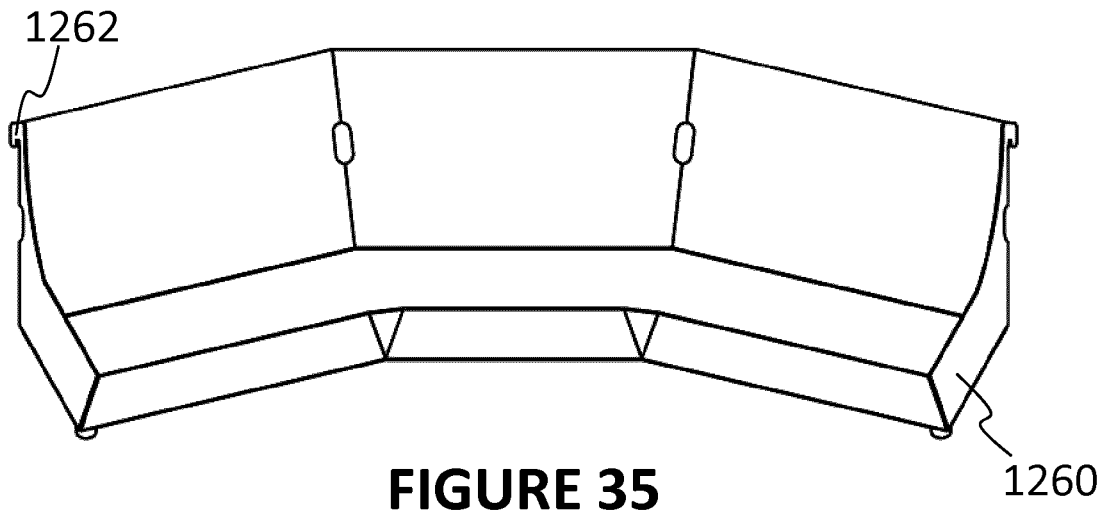
FIG. 35 is a front view illustrating the removable body of a unit of the system for plant growth, according to an embodiment of the invention.
Figure 36:
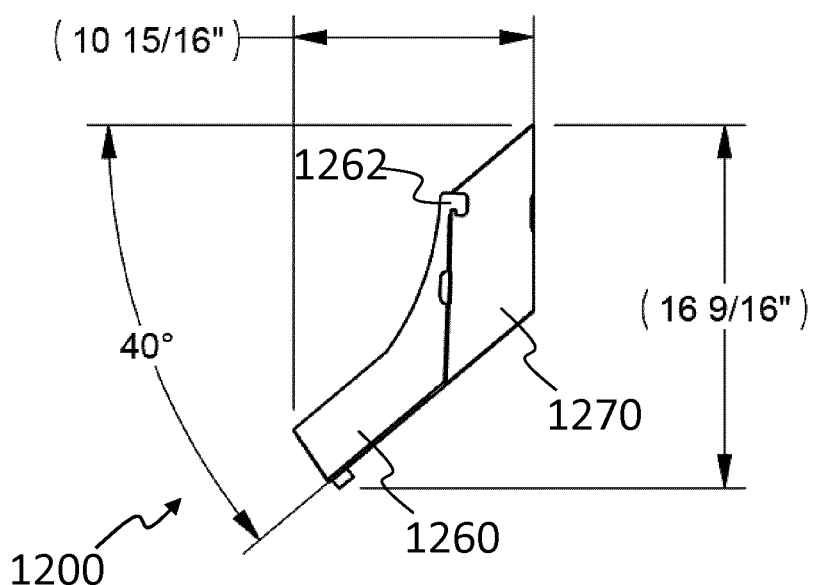
FIG. 36 is a side view illustrating a unit of the system for plant growth with the removable body hooked on a socket, according to an embodiment of the invention.

The apertures 1220 and the surface in which they are formed can advantageously belong to a removable body 1260 of the unit 1200. The unit 1200 can also comprise a socket 1270 which is fixed to the frame 1190 of the system 1100 and can receive the removable body 1260, for example using a hook system 1262 as shown in FIGS. 35-36.

Each unit should comprise devices for plant growth, such as inner conducts for water circulation which connect with a bottom of the apertures 1220. The inner conducts should have input and output connectors to connect with supply tubing or with adjacent units to form a network.

Figure 37:
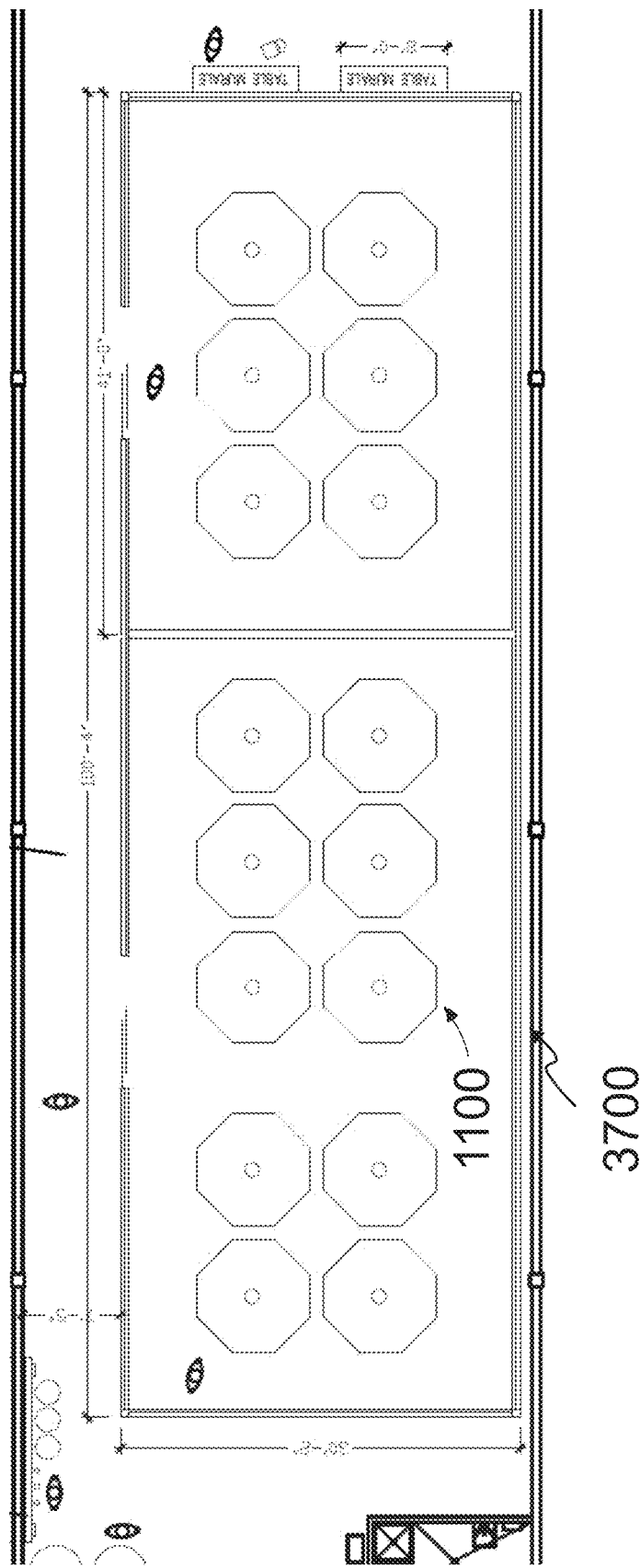
FIG. 37 is a top view illustrating a facility with a plurality of systems for plant growth, according to an embodiment of the invention.

FIG. 37 shows that a system 1100, and preferably a plurality of systems 1100, can be installed in a room 3700 to form a vertical farming facility. The vertical farming facility is typically in a closed environment, i.e., not outside, and preferably with controlled interaction with the outside, normally from limited to none. The absence of significant interactions with the outside ensures that the closed environment in which the plants are grown is free from insects, parasites and sources of diseases which would then require the application of insecticides, pesticides and chemical treatments. In a closed environment, these irritants are very limited and the use of such compounds can therefore be avoided. This results in pesticide-free produce.

Figure 38:
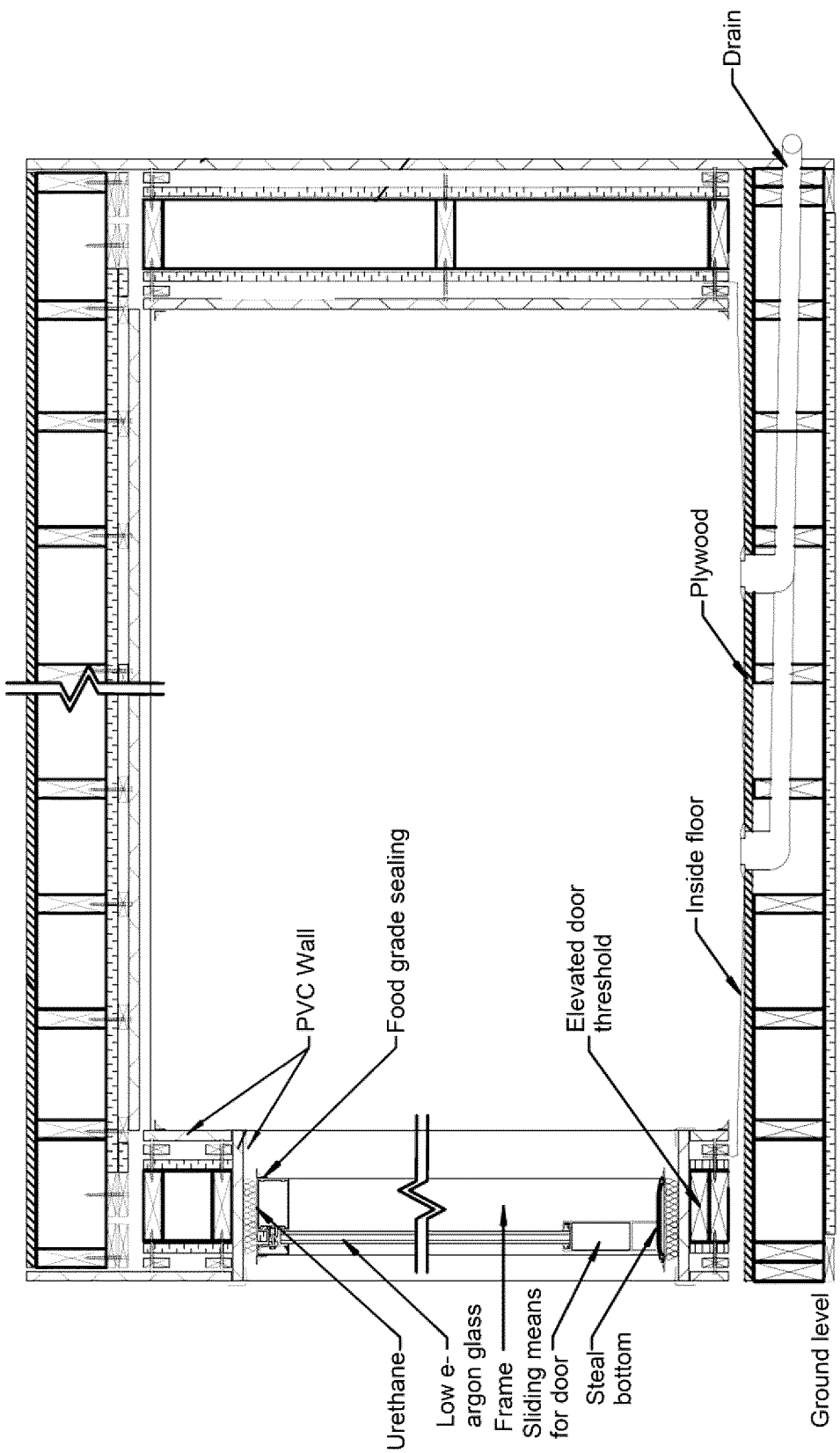
FIG. 38 is a cross-section illustrating the enclosure for the facility with a plurality of systems for plant growth, according to an embodiment of the invention.

FIG. 37 shows that the enclosure containing the plurality of systems 1100 is a closed room. FIG. 38 illustrates the enclosure which forms the closed room. In order to prevent insects and pests of all sorts to enter the enclosure, it should be sufficiently airtight, and panels made of PVC appear as an appropriate option for making up the walls of the enclosure. The room should have its own door to allow human passage and be closed by default to close the room. Tubing can be provided, typically entering the room through the ceiling or an upper portion of the walls to irrigate the systems 1100 containing the plants and dispense other substances, such as nutrients. Tubing should connect with the modular units 1200 and then typically exits the room through the floor or a lower portion of the walls to evacuate unabsorbed water and any other liquids dripping from the plants. The same applies to cabling and other ducts that take various substances in or out of the room.

Walls of the room typically comprises structural elements to hold the PVC panels or other rigid panels forming the surface of the walls, and may also comprise insulating elements therein.

A slight relative overpressure can be provided in the room through adequate pumping or venting in order to ensure that air flows outwardly and not inwardly when the room door is open, avoiding ingress of contaminants.

The PVC panels may also apply to the partition walls of the modules 100 described above in relation with FIGS. 1-11.

Figure 22:
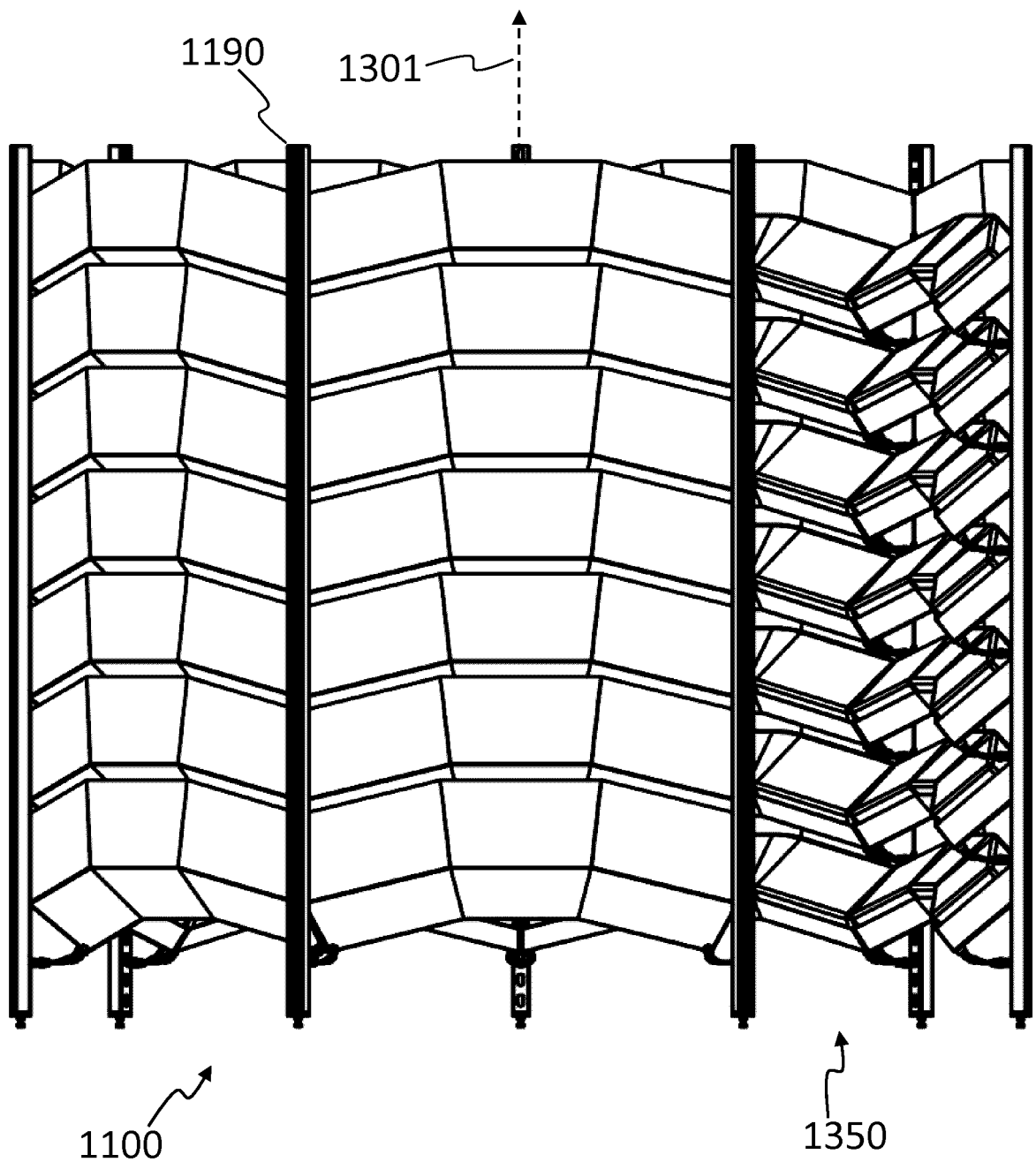
FIG. 22 is a front view illustrating the system of FIG. 21.

According to an embodiment, the modules 100 of FIGS. 1-11 are modified to replace the linear racks 200 by the systems 1100 as shown in FIGS. 21-23 and uses the structure as shown in FIGS. 12-19 to support them.

According to an embodiment, the units 1200 described in relation with FIGS. 30-36 can be used in the racks of the modules 100 of FIGS. 1-11, with the notable exception that they are not arranged angularly to form an arc of circle, and are rather arranged linearly sequentially to form a linear row within each rack 200. In that case, the modular units are fastened to the posts forming the vertical portion of the racks 200, or installed on tablets which are themselves fastened to the posts forming the vertical portion of the racks 200, the vertical portion of the racks 200 being all the posts belonging to a same one of the racks 200.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A module for vertical farming, the module forming a closed and controlled environment while being self-standing and comprising:
- an inner side and an opposed inner side along a longitudinal direction of the module;
- a corridor extending in the longitudinal direction, along the inner side;
- racks for growing plants therein, wherein the racks extend lengthwise from the corridor in a transverse direction, the transverse direction being transverse to the longitudinal direction;
- lighting walls which extend lengthwise from the corridor in the transverse direction and which are interspaced between the racks, the lighting walls and the racks forming rows for passage, wherein each row for passage of the rows for passage comprises, on one side, plants growing within a rack and, on another side, a lighting wall for illuminating the plants;
- a plurality of posts forming a grid having rows of posts distributed in both the longitudinal direction and the transverse direction, each one of the plurality of posts extending vertically and having a bottom and a top, the rows of posts comprising longitudinal rows of posts distributed in the longitudinal direction and transverse rows of posts distributed in the transverse direction;
- diagonal reinforcing support members within pairs of adjacent posts in two longitudinal rows of posts extending along the inner side and the opposed inner side, wherein all longitudinal rows of posts which extend in the longitudinal direction, other than the two longitudinal rows of posts extending along the inner side and the opposed inner side, are free of diagonal reinforcing support members thereby allowing transverse passage; and
- horizontal poles connecting the transverse rows of posts to each other by holding together, at their tops, pairs of longitudinally adjacent posts in the longitudinal rows of posts, wherein all the plurality of posts extends within the racks except a row of posts distributed in the longitudinal direction along the corridor by the inner side of the module.

2. The module of claim 1, wherein the diagonal reinforcing support members within pairs of adjacent posts which extend along the inner side and the opposed inner side are provided in a pair of crossing diagonal reinforcing support members forming an X shape.

3. The module of claim 1, wherein within the posts which extend within the racks, there is, between pairs of adjacent posts within the transverse direction, a diagonal reinforcing support member within the racks to increase a support thereof.

4. The module of claim 1, further comprising a plurality of floor anchors and a plurality of ceiling anchors corresponding to the floor anchors, located respectively at the bottom and at the top of each one of the plurality of posts.

5. The module of claim 1, further comprising walls, a ceiling and a floor to create a partition between an inside and an outside of the module thereby enabling the control of an environment inside the module.

6. The module of claim 5, wherein the racks for growing plants extend from the floor to the ceiling forming transverse passages such that the plants occupy an entire height of the module and prevent a flow of air to bypass the racks from above or from below.

7. The module of claim 1, further comprising additional horizontal poles connecting the longitudinal rows of posts to each other by holding together, at at least one of their tops and their bottoms, pairs of transversely adjacent posts in the transverse rows of posts.

8. The module of claim 1, further comprising additional horizontal poles connecting the longitudinal rows of posts to each other by holding together, at their tops, pairs of transversely adjacent posts in the transverse rows of posts.

9. A module for vertical farming, the module forming a closed and controlled environment while being self-standing and comprising:
- an inner side and an opposed inner side along a longitudinal direction of the module;
- a corridor extending in the longitudinal direction, along the inner side;
- racks for growing plants therein, wherein the racks extend lengthwise from the corridor in a transverse direction, the transverse direction being transverse to the longitudinal direction, the racks having a corridor end and a row end near the opposed inner side;
- lighting walls which extend lengthwise from the corridor in the transverse direction and which are interspaced between the racks, the lighting walls and the racks forming rows for passage, wherein each row for passage of the rows for passage comprises, on one side, plants growing within a rack and, on another side, a lighting wall for illuminating the plants;
- a plurality of posts forming a grid having rows of posts distributed in both the longitudinal direction and the transverse direction, the rows of posts comprising longitudinal rows of posts distributed in the longitudinal direction and transverse rows of posts distributed in the transverse direction, each one of the plurality of posts extending vertically and having a bottom and a too, wherein a portion of the plurality of posts is distributed in the transverse direction between the corridor end and the row end of a same one of the racks, namely posts in the rack portion; and
- diagonal reinforcing support members installed between pairs of adjacent posts in the rack portion wherein all the plurality of posts extends within the racks except a row of posts distributed in the longitudinal direction along the corridor by the inner side of the module.

10. The module of claim 9, further comprising a plurality of floor anchors and a plurality of ceiling anchors corresponding to the floor anchors, located respectively at the bottom and at the top of each one of the plurality of posts.

11. The module of claim 10, further comprising tiles which are disposed under the plurality of floor anchors or over the plurality of ceiling anchors, the tiles covering a whole floor surface or a whole ceiling surface, respectively, to form a partition between an inside and an outside of the module with respect to the floor surface or ceiling surface.

12. The module of claim 9, further comprising walls, a ceiling and a floor to create a partition between an inside and an outside of the module thereby enabling the control of an environment inside the module.

13. The module of claim 9, further comprising horizontal poles connecting the transverse rows of posts to each other by holding together, at their tops, pairs of longitudinally adjacent posts in the longitudinal rows of posts.

14. The module of claim 13, further comprising additional horizontal poles connecting the longitudinal rows of posts to each other by holding together, at at least one of their tops and their bottoms, pairs of transversely adjacent posts in the transverse rows of posts.

15. A method for vertical farming comprising the steps of:
providing a module enclosed by walls, a ceiling and a floor, the module forming a closed and controlled environment while being self-standing;
installing a plurality of posts hand forming a grid having rows of posts distributed in both a longitudinal direction and a transverse direction, the transverse direction being transverse to the longitudinal direction, each one of the plurality of posts extending vertically and having a bottom and a top, the rows of posts comprising longitudinal rows of posts distributed in the longitudinal direction and transverse rows of posts distributed in the transverse direction;
in the longitudinal direction, installing horizontal poles connecting the transverse rows of posts to each other by holding together, at their tops, pairs of longitudinally adjacent posts in the longitudinal rows of posts;
in the longitudinal direction, along an inner side of the module, installing diagonal support members between adjacent posts, forming a corridor alongside the diagonal support members and parallel thereto;
in the longitudinal direction, along an opposed inner side of the module, installing diagonal support members between adjacent posts for strengthening a structure of the module;
in the transverse direction, installing diagonal support members between transversely adjacent posts, without blocking the corridor; and
in the transverse direction, along the transverse rows of posts distributed in the transverse direction, providing racks for growing plants, the racks extending vertically from the floor to the ceiling, forming transverse passages such that the plants occupy an entire height of the module and prevent a flow of air to bypass the racks from above or from below, the racks further extend in length in the transverse direction from the opposed inner side of the module and reaching the corridor without blocking the corridor; and
installing lighting walls which extend lengthwise from the corridor in the transverse direction and which are interspaced between the racks, the lighting walls and the racks forming rows for passage, wherein each row for passage of the rows for passage comprises, on one side, plants growing within a rack and, on another side, a lighting wall for illuminating the plants, wherein all the plurality of posts extends within the racks except a row of posts distributed in the longitudinal direction along the corridor by the inner side of the module.

16. The method of claim 15, wherein the diagonal support members within the longitudinal direction are provided in a pair of crossing diagonal reinforcing support members forming an X shape.

17. The method of claim 15, further comprising providing a plurality of floor anchors and a plurality of ceiling anchors corresponding to the floor anchors, located respectively at the bottom and at the top of each one of the plurality of posts.

18. The method of claim 15, further comprising connecting ventilation ducts having inputs at the inner side and outputs at the opposed inner side thereby providing a mostly uniform air temperature in each of the transverse passages.

19. The method of claim 15, further comprising installing additional horizontal poles connecting the longitudinal rows of posts to each other by holding together, at at least one of their tops and their bottoms, pairs of transversely adjacent posts in the transverse rows of posts.

* * * * *